(12) United States Patent
Khan et al.

(10) Patent No.: US 8,369,450 B2
(45) Date of Patent: Feb. 5, 2013

(54) PILOT BOOSTING AND TRAFFIC TO PILOT RATIO ESTIMATION IN A WIRELESS COMMUNICATION SYSTEM

(75) Inventors: Farooq Khan, Allen, TX (US);
Zhouyue Pi, Richardson, TX (US);
Jiannan Tsai, Plano, TX (US);
Jianzhong Zhang, Irving, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1282 days.

(21) Appl. No.: 12/155,311

(22) Filed: Jun. 2, 2008

(65) Prior Publication Data
US 2009/0041151 A1 Feb. 12, 2009

Related U.S. Application Data

(60) Provisional application No. 60/963,681, filed on Aug. 7, 2007.

(51) Int. Cl.
*H04L 27/00* (2006.01)
*H04B 7/06* (2006.01)

(52) U.S. Cl. ...................................... 375/299; 455/101

(58) Field of Classification Search .................. 375/260, 375/267, 295, 299, 377, 296, 297; 455/99, 455/101
See application file for complete search history.

(56) References Cited

U.S. PATENT DOCUMENTS
2008/0267318 A1 * 10/2008 Ihm et al. .................. 375/299
2012/0114030 A1 * 5/2012 Yue et al. .................. 375/227
* cited by examiner Primary Examiner — Tesfaldet Bocure

(57) ABSTRACT

Methods and circuits for assigning pilot boosting factors and calculating traffic to pilot ratios in a wireless communication system. The data to be transmitted is first modulated to generate a plurality of data modulation symbols. The plurality of data modulation symbols and a plurality of reference signal symbols are mapped into transmission resources of each of a plurality of antennas in accordance with a transmit diversity scheme. The transmission resources of each of the antennas are divided into a plurality of subcarriers in a frequency domain and a plurality of time units in a time domain. Then, a power scaling factor are assigned for data modulation symbols on each of the antennas in dependence upon power levels of the reference signal symbols to maintain a fixed power level across the plurality of antennas in each time unit. Finally, the data modulation symbols and the reference signal symbols are transmitted via the plurality of antennas in accordance with the mapping scheme and the assigned scaling factors.

33 Claims, 20 Drawing Sheets

FIG. 2

|  | t1 | t2 |
|---|---|---|
| ANT 1 | $S_1$ | $-S_2^*$ |
| ANT 2 | $S_2$ | $S_1^*$ |

FIG. 3

|  | f1 | f2 |
|---|---|---|
| ANT 1 | $S_1$ | $-S_2^*$ |
| ANT 2 | $S_2$ | $S_1^*$ |

FIG. 4

|  | f1 | f2 |
|---|---|---|
| ANT 1 | $S_1$ | $S_2$ |
| ANT 2 | $-S_2^*$ | $S_1^*$ |

FIG. 18

PILOT BOOSTING AND TRAFFIC TO PILOT RATIO ESTIMATION IN A WIRELESS COMMUNICATION SYSTEM

CLAIM OF PRIORITY

This application makes reference to, incorporates the same herein, and claims all benefits accruing under 35 U.S.C. §119 from a provisional application earlier filed in the U.S. Patent & Trademark Office on 7 Aug. 2007 and there duly assigned Ser. No. 60/963,681.

BACKGROUND OF THE INVENTION

1. Field of the Invention

The present invention relates to methods and circuits for assigning pilot boosting factors and calculating traffic to pilot ratios in a wireless communication system.

2. Description of the Related Art

A typical cellular radio system includes a number of fixed base stations and a number of mobile stations. Each base station covers a geographical area, which is defined as a cell. Typically, a non-line-of-sight (NLOS) radio propagation path exists between a base station and a mobile station due to natural and man-made objects disposed between the base station and the mobile station. As a consequence, radio waves propagate while experiencing reflections, diffractions and scattering. The radio wave which arrives at the antenna of the mobile station in a downlink direction, or at the antenna of the base station in an uplink direction, experiences constructive and destructive additions because of different phases of individual waves generated due to the reflections, diffractions, scattering and out-of-phase recombination. This is due to the fact that, at high carrier frequencies typically used in a contemporary cellular wireless communication, small changes in differential propagation delays introduces large changes in the phases of the individual waves. If the mobile station is moving or there are changes in the scattering environment, then the spatial variations in the amplitude and phase of the composite received signal will manifest themselves as the time variations known as Rayleigh fading or fast fading attributable to multipath reception. The time-varying nature of the wireless channel require very high signal-to-noise ratio (SNR) in order to provide desired bit error or packet error reliability.

The scheme of diversity is widely used to combat the effect of fast fading by providing a receiver with multiple faded replicas of the same information-bearing signal.

The schemes of diversity in general fall into the following categories: space, angle, polarization, field, frequency, time and multipath diversity. Space diversity can be achieved by using multiple transmit or receive antennas. The spatial separation between the multiple antennas is chosen so that the diversity branches, i.e., the signals transmitted from the multiple antennas, experience fading with little or no correlation. Transmit diversity, which is one type of space diversity, uses multiple transmission antennas to provide the receiver with multiple uncorrelated replicas of the same signal. Transmission diversity schemes can further be divided into open loop transmit diversity and closed-loop transmission diversity schemes. In the open loop transmit diversity approach no feedback is required from the receiver. In one type of closed loop transmit diversity, a receiver knows an arrangement of transmission antennas, computes a phase and amplitude adjustment that should be applied at the transmitter antennas in order to maximize a power of the signal received at the receiver. In another arrangement of closed loop transmit diversity referred to as selection transmit diversity (STD), the receiver provides feedback information to the transmitter regarding which antenna(s) to be used for transmission.

It can be noted that the power available from each antenna port for subcarriers other than the reference signals, e.g., data subcarriers, vary from OFDM symbol to OFDM symbol. Keeping the power level the same across antennas on these subcarriers results in inefficient use of power because power level is limited to the minimum power level available from a given antenna port even though other ports may have extra power available. Likewise, keeping the power level the same across OFDM symbols on these subcarriers also results in inefficient use of power because power level is limited to the minimum power level available in one OFDM symbol although other OFDM symbols may have extra power available. Another solution could be to puncture some data subcarriers in OFDM symbols containing pilots to keep the power level the same across the symbols. This approach, however, may result in waste of subcarrier resources thus degrading system performance and capacity.

SUMMARY OF THE INVENTION

It is therefore an object of the present invention to provide an improved method and transmitter circuit for transmitting data via multiple antennas.

It is another object to provide a method and transmitter circuit for transmitting data by using multiple antennas transmission diversity scheme.

According to one aspect of the present invention, data to be transmitted is modulated to generate a plurality of data modulation symbols. The plurality of data modulation symbols and a plurality of reference signal symbols are mapped into transmission resources of each of a plurality of antennas in accordance with a transmit diversity scheme. The transmission resources of each of the antennas are divided into a plurality of subcarriers in a frequency domain and a plurality of time units in a time domain. Then, a power scaling factor are assigned for data modulation symbols on each of the antennas in dependence upon power levels of the reference signal symbols to maintain a fixed power level across the plurality of antennas in each time unit. Finally, the data modulation symbols and the reference signal symbols are transmitted via the plurality of antennas in accordance with the mapping scheme and the assigned scaling factors.

When reference signal symbols and four data modulation symbols $S_1$, $S_2$, $S_3$ and $S_4$ are transmitted over six subcarriers via four antennas in a certain timer unit, a first reference signal symbol may be transmitted via a first antenna over a sixth subcarrier with one-third of a total power that is available for transmission over the six subcarriers in the certain time unit, and a second reference signal symbol may be transmitted via a second antenna over a third subcarrier with one-third of the total power. A transmission matrix with the scaling factors for the four data modulation symbols may be established by:

$$T = \begin{bmatrix} T_{11} & T_{12} & T_{14} & T_{15} \\ T_{21} & T_{22} & T_{24} & T_{25} \\ T_{31} & T_{32} & T_{34} & T_{35} \\ T_{41} & T_{42} & T_{44} & T_{45} \end{bmatrix}$$

-continued $$= \begin{bmatrix} S_1 & -S_2^* & 0 & 0 \\ 0 & 0 & S_3 & -S_4^* \\ \sqrt{3/2}\,S_2 & \sqrt{3/2}\,S_1^* & 0 & 0 \\ 0 & 0 & \sqrt{3/2}\,S_4 & \sqrt{3/2}\,S_3^* \end{bmatrix},$$

where $T_{ij}$ represents the symbol transmitted on the ith antenna port and the jth subcarrier.

A signal containing information regarding channel gains for each of the data modulation symbols may be transmitted. The channel gains for each of the data modulation symbols $S_1$ and $S_2$ may be established by:

$$g_{12} = \left(h_0^2 + \frac{3}{2}h_2^2\right)S_i, \text{ for } i = 1, 2,$$

where $h_0$, $h_1$, $h_2$ and $h_3$ are channel gains from the first antenna, the second antenna, the third antenna and the fourth antenna, respectively. The channel gains for each of the data modulation symbols $S_3$ and $S_4$ may be established by:

$$g_{34} = \left(h_1^2 + \frac{3}{2}h_3^2\right)S_i, \text{ for } i = 3, 4.$$

Alternatively, a third reference signal symbol may be transmitted via a third antenna over a sixth subcarrier with one-third of a total power that is available for transmission over the six subcarriers, and a fourth reference signal symbol may be transmitted via a fourth antenna over a third subcarrier with one-third of the total power. A transmission matrix with the scaling factors for the four data modulation symbols may be established by:

$$T = \begin{bmatrix} T_{11} & T_{12} & T_{14} & T_{15} \\ T_{21} & T_{22} & T_{24} & T_{25} \\ T_{31} & T_{32} & T_{34} & T_{35} \\ T_{41} & T_{42} & T_{44} & T_{45} \end{bmatrix}$$
$$= \begin{bmatrix} \sqrt{3/2}\,S_1 & -\sqrt{3/2}\,S_2^* & 0 & 0 \\ 0 & 0 & \sqrt{3/2}\,S_3 & -\sqrt{3/2}\,S_4^* \\ S_2 & S_1^* & 0 & 0 \\ 0 & 0 & S_4 & S_3^* \end{bmatrix},$$

where $T_{ij}$ represents the symbol transmitted on the ith antenna port and the jth subcarrier.

Still alternatively, the transmission matrix may be established by:

$$T = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

where $T_{ij}$ represents the symbol transmitted on the ith antenna port and the jth subcarrier.

A signal containing information regarding the ratios between the assigned scaling factors of the antennas may be transmitted.

In addition, a signal containing information regarding channel gains for each of the data modulation symbols may be transmitted. The channel gains may be calculated in dependence upon the assigned scaling factors of the antennas.

A signal containing information regarding the ratios of the total power from all of the antennas for each data modulation symbol between different time units may be transmitted.

Still alternatively, a first reference signal symbol may be transmitted via a first antenna over a sixth subcarrier with two-thirds of a total power that is available for transmission over the six subcarriers, and a second reference signal symbol may be transmitted via a second antenna over a third subcarrier with two-thirds of the total power. Then, a transmission matrix with the scaling factors for the four data modulation symbols may established by:

$$T = \begin{bmatrix} T_{11} & T_{12} & T_{14} & T_{15} \\ T_{21} & T_{22} & T_{24} & T_{25} \\ T_{31} & T_{32} & T_{34} & T_{35} \\ T_{41} & T_{42} & T_{44} & T_{45} \end{bmatrix} = \begin{bmatrix} S_1 & -S_2^* & 0 & 0 \\ 0 & 0 & S_3 & -S_4^* \\ \sqrt{3}\,S_2 & \sqrt{3}\,S_1^* & 0 & 0 \\ 0 & 0 & \sqrt{3}\,S_4 & \sqrt{3}\,S_3^* \end{bmatrix},$$

where $T_{ij}$ represents the symbol transmitted on the ith antenna port and the jth subcarrier.

A signal containing information regarding channel gains for each of the data modulation symbols may be transmitted. The channel gains for each of the data modulation symbols $S_1$ and $S_2$ may be established by:

$g_{12} = (h_0^2 + 3h_2^2)S_i$, for $i=1, 2$; and

The channel gains for each of the data modulation symbols $S_3$ and $S_4$ may be established by:

$g_{34} = (h_1^2 + 3h_3^2)S_i$, for $i=3, 4$, where $h_0$, $h_1$, $h_2$ and $h_3$ are channel gains from the first antenna, the second antenna, the third antenna and the fourth antenna, respectively.

According to another aspect of the present invention, data to be transmitted is modulated to generate a plurality of data modulation symbols. The plurality of data modulation symbols are mapped into at least one modulation layer in a multiple input and multiple output system. The plurality of data modulation symbols and a plurality of reference signal symbols are mapped into transmission resources of a plurality of transmission antennas in accordance with a precoding matrix, with one modulation layer corresponding to a selected column in the precoding matrix, and each row of the precoding matrix corresponding to an antenna from a plurality of antennas for transmitting the data modulation symbols. Then, a power scaling factor is assigned to each of the rows in the preceding matrix in dependence upon power levels of the reference signal symbols to maintain a fixed power level across the plurality of antennas in a certain time unit. Finally, the data modulation symbols and the reference signal symbols are transmitted via the plurality of antennas.

The precoding matrix may be constructed based upon a Householder matrix, with the Householder matrix being established by:

$$M_1 = I_4 - 2u_1 u_1^H / \|u_1\|^2 = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

where $u_1^T = [1\ -1\ -1\ -1]$.

Two reference signal symbols and two modulation layers may be transmitted over six subcarriers via four antennas in the certain time unit. A first reference signal symbol may be transmitted over a sixth subcarrier via a first antenna by using one-third of a total power that is available for transmission over the six subcarriers, and a second reference signal symbol may be transmitted via a second antenna over a third subcarrier with one-third of the total power. The precoding matrix may be established by:

$$M'_1 = 0.5 * \begin{bmatrix} 1 & 0 & 1 & 0 \\ 1 & 0 & -1 & 0 \\ 3/2 & 0 & 3/2 & 0 \\ 3/2 & 0 & -3/2 & 0 \end{bmatrix}$$

with a first modulation layer corresponding to the first column of the precoding matrix, and a second modulation layer corresponding to the third column of the precoding matrix.

Alternatively, the precoding matrix may be constructed based upon a Fourier matrix, with an N×N Fourier matrix being established by:

$$P_N = e^{j2\pi mn/N} \, m,n=0,1,\ldots(N-1).$$

A first reference signal symbol may be transmitted over a sixth subcarrier via a first antenna by using one-third of a total power that is available for transmission over the six subcarriers, and a second reference signal symbol may be transmitted via a second antenna over a third subcarrier with one-third of the total power. Then, the precoding matrix may be established by:

$$P'_4 = \begin{bmatrix} 1 & 1 & 1 & 1 \\ 1 & j & -1 & -j \\ 3/2 & -3/2 & 3/2 & -3/2 \\ 3/2 & -j3/2 & -3/2 & j3/2 \end{bmatrix}$$

with a first modulation layer corresponding to the first column of the precoding matrix, a second modulation layer corresponding to the second column of the precoding matrix, a third modulation layer corresponding to the third column of the precoding matrix, and a fourth modulation layer corresponding to the four column of the precoding matrix.

According to yet another aspect of the present invention, data signals, reference signals and a control signal transmitted from a transmitter via a plurality of transmission antennas are received at a receiver. The control signal indicates traffic to pilot ratios on respective transmission antennas. Then, power levels on respective transmission antennas are derived in dependence upon the traffic to pilot ratios. Finally, the data signals are decoded in dependence upon the derived power levels on the transmission antennas.

According to still another aspect of the present invention, data signals, reference signals and a control signal transmitted from a transmitter via a plurality of transmission antennas are received at a receiver. The control signal indicates power boosting factors of the reference signals. Then, power levels on respective transmission antennas are derived in dependence upon the power boosting factors. Finally, the data signals are decoded in dependence upon the derived power levels on the transmission antennas.

According to still yet another aspect of the present invention, data signals, reference signals and a control signal transmitted from a transmitter via a plurality of transmission antennas are received at a receiver. The control signal indicates nominal traffic to pilot ratios and power levels on respective transmission antennas. Then, actual traffic to pilot ratios are derived independence upon the nominal traffic to pilot ratios. Finally, the data signals are decoded in dependence upon the actual traffic to pilot ratios and the power levels on respective transmission antennas.

According to a further aspect of the present invention, a plurality of data modulation symbols of a plurality of data packets and a plurality of reference signal symbols are mapped into transmission resources of a transmission antenna in accordance with a certain transmit diversity scheme, with the transmission resources being divided into a plurality of subcarriers in a frequency domain and a plurality of time units in a time domain. In a k-th time unit, N subcarriers are available for transmitting signals. The N subcarriers include $N_{RS}^k$ subcarriers for transmitting reference signal symbols, $N_{idle}^k$ subcarriers that are concurrently unused, and $N_{data}^k$ subcarriers for transmitting data modulation symbols. Then, bandwidth ratios between respective corresponding pairs of time units for each data packet and power ratios between respective corresponding pairs of time units are determined for each data packet to maintain a constant bandwidth ratio between each pair of time units across all data packets and a constant power ratio between each pair of time units across all data packets. The bandwidth ratio $\eta(i,j)$ between an i-th time unit and a j-th time unit is established for each data packet by:

$$\eta(i,j) = \frac{N - N_{RS}^i - N_{idle}^i}{N - N_{RS}^j - N_{idle}^j}.$$

The power ratio $\gamma(i,j)$ between an i-th time unit and a j-th time unit for each data packet is established by:

$$\gamma(i,j) = \frac{N - \alpha_{RS}^i N_{RS}^i}{N - \alpha_{RS}^j N_{RS}^j} \cdot \frac{1}{\eta(i,j)},$$

where $\alpha_{RS}^k$ is a power boosting factor for the reference signal symbols in a k-th time unit. Finally, the plurality of data modulation symbols of the plurality of data packets and the reference signal symbols are transmitted via the transmission antenna by using the transmission resources, with the transmission of at least one data packet being in accordance with the determined bandwidth ratios and power ratios.

In addition, a data subcarrier traffic-to-nominal-power-spectral-density-ratio (TNPR) is determined for each of the time units. The data subcarrier TNPR for a k-th time unit is established by:

$$\rho_k = \frac{N - \alpha_{RS}^k N_{RS}^k}{N - N_{RS}^k - N_{idle}^k}.$$

Alternatively, a nominal data subcarrier traffic-to-pilot-ratio (TPR) is determined for each of the time units. The nominal data subcarrier TPR for a k-th time unit is established by:

$$\sigma_k = \frac{1}{\alpha_{RS}^k} \cdot \frac{N - \alpha_{RS}^k N_{RS}^k}{N - N_{RS}^k - N_{idle}^k}.$$

According to still a further aspect of the present invention, a plurality of data modulation symbols of a plurality of data packets and a plurality of reference signal symbols are mapped into transmission resources of a plurality of transmission antennas in accordance with a certain transmit diversity scheme. The transmission resources are divided into a plurality of subcarriers in a frequency domain and a plurality of time units in a time domain. In a k-th time unit, N subcarriers are available for transmitting signals via all of the plurality of transmission antennas. The N subcarriers include $N_{RS}^k$ subcarriers for transmitting reference signal symbols, $N_{idle}^k$ subcarriers that are concurrently unused, and $N_{data}^k$ subcarriers for transmitting data modulation symbols. Then, bandwidth ratios between respective corresponding pairs of time units are determined for each data packet, and power ratios between respective corresponding pairs of transmission antennas in different time units are determined for each data packet to maintain a constant bandwidth ratio between each pair of time units across all data packets and a constant power ratio between each pair of antennas in different time units across all data packets. The bandwidth ratio $\eta(i,j)$ between an i-th time unit and a j-th time unit for each data packet is established by:

$$\eta(i, j) = \frac{N - N_{RS}^i - N_{idle}^i}{N - N_{RS}^j - N_{idle}^j}.$$

The power ratio $\gamma^{t,s}(i,j)$ between a t-th transmission antenna in an i-th time unit and an s-th transmission antenna in a j-th time unit for each data packet is established by:

$$\gamma^{t,s}(i, j) = \frac{N - \alpha_{RS}^{j,t} N_{RS}^{i,t}}{N - \alpha_{RS}^{j,s} N_{RS}^{j,s}} \cdot \frac{1}{\eta(i, j)},$$

where $\alpha_{RS}^{k,t}$ is a power boosting factor for the reference signal symbols from a t-th transmission antenna in a k-th time unit. Finally, the plurality of data modulation symbols of the plurality of data packets and the reference signal symbols are transmitted via the plurality of transmission antennas by using the transmission resources, with the transmission of at least one data packet being in accordance with the determined bandwidth ratios and power ratios.

According to still another aspect of the present invention, data signals and reference signals in a plurality of time units transmitted from a transmitter via a transmission antenna are received at a receiver. The receiver also receives information regarding the number of subcarriers that are available for transmission in each time units, the number of subcarriers for transmitting reference signals in each time unit, the number of subcarriers for transmitting data signals in each time unit, the number of subcarriers that are available for transmission and are not used in each time unit, and power boosting factors for the reference signals in each time unit. The receiver determines bandwidth ratios between respective corresponding pairs of time units and power ratios between respective corresponding pairs of time units. The bandwidth ratio $\eta(i,j)$ between an i-th time unit and a j-th time unit and the power ratio $\gamma(i,j)$ between an i-th time unit and a j-th time unit for each data packet are respectively established by:

$$\eta(i, j) = \frac{N - N_{RS}^i - N_{idle}^i}{N - N_{RS}^j - N_{idle}^j},$$

and $$\gamma(i, j) = \frac{N - \alpha_{RS}^i N_{RS}^i}{N - \alpha_{RS}^j N_{RS}^j} \cdot \frac{1}{\eta(i, j)},$$

where N being the number of subcarriers that are available for transmission in a k-th time unit, $N_{RS}^k$ being the number of subcarriers for transmitting reference signal symbols in the k-th time unit, $N_{idle}^k$ being the number of subcarriers that are concurrently unused in the k-th time unit, $N_{data}^k$ being the number of subcarriers for transmitting data modulation symbols in the k-th time unit, and $\alpha_{RS}^k$ is a power boosting factor for the reference signal symbols in a k-th time unit. Finally, the received data signals are decoded by using the determined bandwidth ratios and power ratios.

According to still another aspect of the present invention, data signals and reference signals in a plurality of time units transmitted from a transmitter via a plurality of transmission antenna are received by a receiver. The receiver also receives information regarding the number of subcarriers that are available for transmission in each time units, the number of subcarriers for transmitting reference signals in each time unit, the number of subcarriers for transmitting data signals in each time unit, the number of subcarriers that are available for transmission and are not used in each time unit, and power boosting factors for the reference signals in each time unit. The receiver determines bandwidth ratios between respective corresponding pairs of time units and power ratios between respective corresponding pairs of transmission antennas in different time units. The bandwidth ratio $\eta(i,j)$ between an i-th time unit and a j-th time unit and the power ratio $\gamma^{t,s}(i,j)$ between a t-th transmission antenna in an i-th time unit and an s-th transmission antenna in a j-th time unit are respectively established:

$$\eta(i, j) = \frac{N - N_{RS}^i - N_{idle}^i}{N - N_{RS}^j - N_{idle}^j},$$

and $$\gamma^{t,s}(i, j) = \frac{N - \alpha_{RS}^{i,t} N_{RS}^{i,t}}{N - \alpha_{RS}^{j,s} N_{RS}^{j,s}} \cdot \frac{1}{\eta(i, j)},$$

where N being the number of subcarriers that are available for transmission in a k-th time unit, $N_{RS}^k$ being the number of subcarriers for transmitting reference signal symbols in the k-th time unit, $N_{idle}^k$ being the number of subcarriers that are concurrently unused in the k-th time unit, $N_{data}^k$ being the number of subcarriers for transmitting data modulation symbols in the k-th time unit, $\alpha_{RS}^{k,t}$ is a power boosting factor for the reference signal symbols from a t-th transmission antenna in the k-th time unit. Finally, the received data signal are decoded by using the determined bandwidth ratios and power ratios.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 schematically illustrates a Space Time Block Code (STBC) transmission diversity scheme for two transmission antennas;

FIG. 3 schematically illustrates a Space Frequency Block Code (SFBC) transmission diversity scheme for two transmission antennas;

FIG. 4 schematically illustrates an alternative Space Frequency Block Code (SFBC) transmission diversity scheme for two transmission antennas;

FIG. 18 schematically illustrates transmission of a single MIMO layer in a first OFDM symbol on virtual antenna 1 using a first column of a precoding matrix according to another embodiment of the principles of the present invention;

DETAILED DESCRIPTION OF THE INVENTION

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

Figure 1:
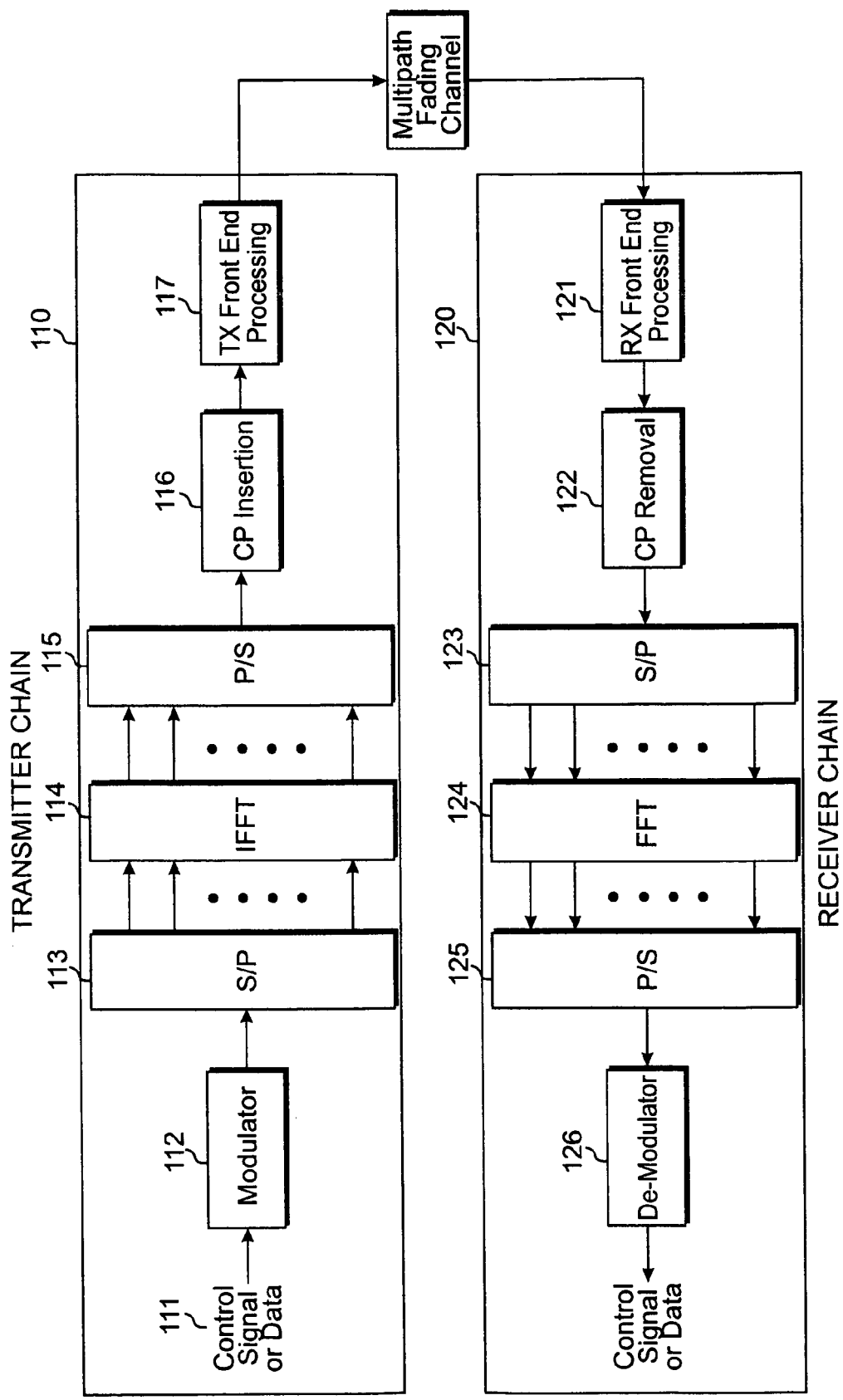
FIG. 1 schematically illustrates an Orthogonal Frequency Division Multiplexing (OFDM) transceiver chain suitable for the practice of the principles of the present inventions.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The scheme of diversity is widely used to combat the effect of fast fading by providing a receiver with multiple faded replicas of the same information-bearing signal. An example of open-loop transmission diversity scheme is the Alamouti 2×1 space-time block code (STBC) transmission diversity scheme as illustrated in FIG. 2. In this approach, during any symbol period, i.e., time period, a transmitter transmits two data symbols via two transmission antennas to a receiver. As shown in FIG. 2, during the first symbol interval t1, symbols $S_1$ and $S_2$ are respectively transmitted via antennas ANT 1 and ANT 2. During the next symbol period t2, symbols $-S^*_2$ and $S^*_1$ are respectively transmitted via antennas ANT 1 and ANT 2, where x* represents complex conjugate of x. After receiving the signals, the receiver performs a plurality of processes to recover original symbols $S_1$ and $S_2$. Note that the instantaneous channel gains g1 and g2 for ANT 1 and ANT 2, respectively, are required for processing at the receiver. Therefore, the transmitter needs to transmit separate pilot symbols via both the antennas ANT 1 and ANT 2 for channel gain estimation at the receiver. The diversity gain achieved by Alamouti coding is the same as that achieved in Maximum Ratio Combining (MRC).

The 2×1 Alamouti scheme can also be implemented in a space-frequency block code (SFBC) transmission diversity scheme as illustrated in FIG. 3. As shown in FIG. 3, symbols $S_1$ and $S_2$ are respectively transmitted to a receiver via antennas ANT 1 and ANT 2 on a first subcarrier having frequency f1 in an Orthogonal Frequency Division Multiplexing (OFDM) system, symbols $-S^*_2$ and $S^*_1$ are respectively transmitted via antennas ANT 1 and ANT 2 on a second subcarrier having frequency f2. Therefore a matrix of transmitted symbols from antennas ANT 1 and ANT 2 can be written as:

$$\begin{bmatrix} T_{11} & T_{12} \\ T_{21} & T_{22} \end{bmatrix} = \begin{bmatrix} S_1 & -S_2^* \\ S_2 & S_1^* \end{bmatrix}, \qquad (1)$$

The received signal at the receiver on subcarrier having frequency f1 is $r_1$, and the received signal at the receiver on subcarrier having frequency f2 is $r_2$. $r_1$ and $r_2$ can be written as:

$$r_1 = h_1 s_1 + h_2 s_2 + n_1$$

$$r_2 = -h_1 s_2^* + h_2 s_1^* + n_2, \qquad (2)$$

where $h_1$ and $h_2$ are channel gains from ANT 1 and ANT 2 respectively. We also assume that the channel from a given antennas does not change between subcarrier having frequency $f_1$ and subcarrier having frequency $f_2$. The receiver performs equalization on the received signals and combines the two received signals ($r_1$ and $r_2$) to recover the symbols $S_1$ and $S_2$. The recovered symbols $S_1$ and $S_2$ can be written as:

$$\begin{aligned} \hat{s}_1 &= h_1^* r_1 + h_2 r_2^* \\ &= h_1^*(h_1 s_1 + h_2 s_2 + n_1) + h_2(-h_1 s_2^* + h_2 s_1^* + n_2)^* \\ &= (|h_1|^2 + |h_2|^2) s_1 + h_1^* n_1 + h_2 n_2^* \end{aligned} \qquad (3)$$

$$\begin{aligned} \hat{s}_2 &= h_2^* r_1 + h_1 r_2^* \\ &= h_2^*(h_1 s_1 + h_2 s_2 + n_1) + h_1(-h_1 s_2^* + h_2 s_1^* + n_2)^* \\ &= (|h_1|^2 + |h_2|^2) s_2 + h_2^* n_1 + h_1 n_2^* \end{aligned}$$

It can be seen that both of the transmitted symbols $S_1$ and $S_2$ achieve full spatial diversity, that is, the each of the transmitted symbols $S_1$ and $S_2$ completely removes an interference from the other one.

An alternative mapping for two transmission antennas SFBC scheme is shown in FIG. 4. A matrix of transmitted symbols from antennas ANT 1 and ANT 2 can be written as:

$$\begin{bmatrix} T_{11} & T_{12} \\ T_{21} & T_{22} \end{bmatrix} = \begin{bmatrix} S_1 & S_2 \\ -S_2^* & S_1^* \end{bmatrix}, \qquad (4)$$

The transmit matrix in Equation (7) for the scheme in FIG. 4 is a transpose of the transmit matrix in Equation (4) for the scheme shown in FIG. 3.

Other proposals found in the art for four transmission antennas transmit diversity combines Frequency Switched Transmit Diversity (FSTD) or Time Switched Transmit Diversity (TSTD) with block codes. In case of combined SFBC+FSTD scheme or STBC+TSTD scheme, the matrix of the transmitted symbols from the four transmission antennas are given as:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix} \qquad (5)$$

where $T_{ij}$ represents symbol transmitted on the ith antenna and the jth subcarrier or jth time slot, and i=1, 2, 3, 4, j=1, 2, 3, 4 for the case of four transmission antennas. A and B are block codes given as below.

$$A = \frac{1}{\sqrt{2}} \begin{bmatrix} S_1 & S_2 \\ -S_2^* & S_1^* \end{bmatrix} \qquad (6)$$

$$B = \frac{1}{\sqrt{2}} \begin{bmatrix} S_3 & S_4 \\ -S_4^* & S_3^* \end{bmatrix}$$

Figure 5:
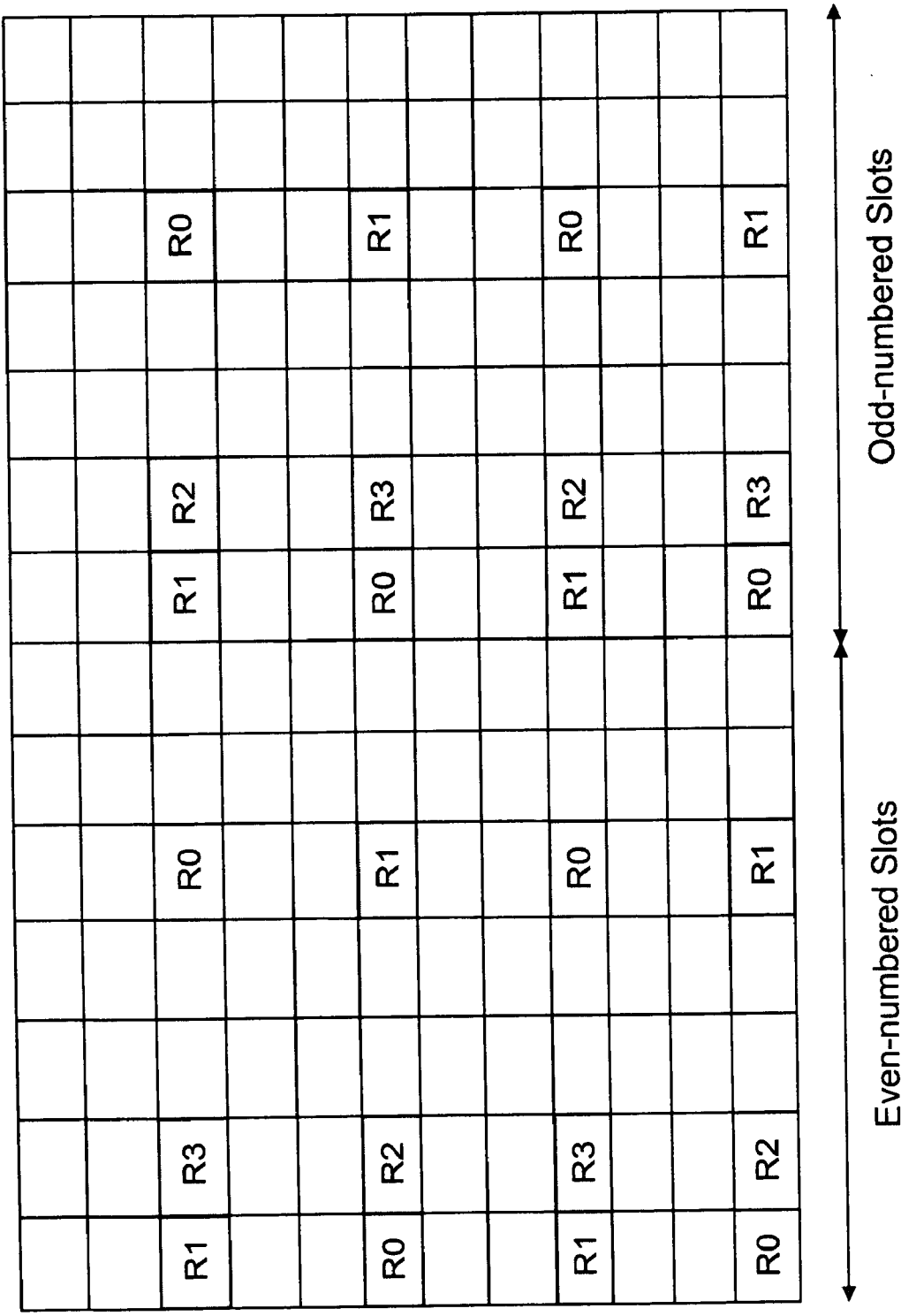
FIG. 5 schematically illustrates mapping of downlink reference signals in a contemporary $3^{rd}$ Generation Partnership Project Long Term Evolution system.

The downlink reference signals mapping for four transmission antennas in the 3GPP LTE ($3^{rd}$ Generation Partnership Project Long Term Evolution) system is shown in FIG. 5. The notation $R_p$ is used to denote a resource element used for reference signal transmission on antenna port p. It can be noted that density on antenna ports 2 and 3 is half the density on antenna ports 0 and 1. This leads to weaker channel estimates on antenna ports 2 and 3 relative to channel estimates on antenna ports 0 and 1.

In a previous U.S. patent application titled "Antenna Mapping in a MIMO Wireless communication System", filed on 11 Jan. 2008, U.S. patent application Ser. No. 12/007,586, an alternative mapping scheme for SFBC-FSTD scheme is proposed. In the proposed scheme, symbols ($S_1$, $S_2$) are transmitted over antennas ports 0 and 2, while symbols is ($S_3$, $S_4$) are transmitted over antenna ports 1 and 3 as given by the transmit matrix below:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix}, \qquad (7)$$

where $T_{ij}$ represents symbol transmitted on the (i−1)th antenna port and the jth subcarrier or jth time slot (i=1, 2, 3, 4, j=1, 2, 3, 4) for the case of 4-Tx antennas. It can be noted that this mapping result in averaging of the unequal channel estimation error effect across the transmitted symbols.

Figure 6:
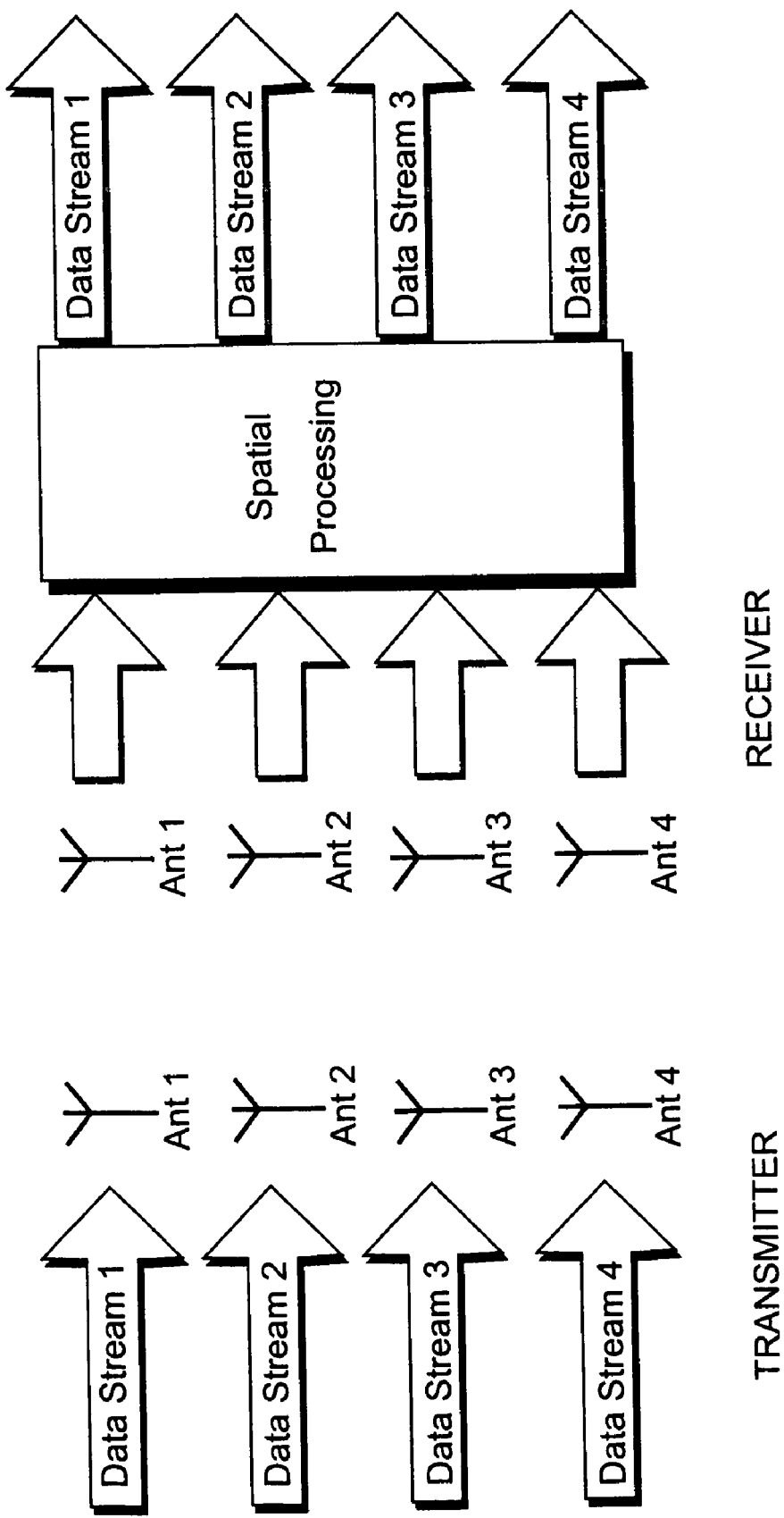
FIG. 6 schematically illustrates a Multiple Input Multiple Output (MIMO) transceiver chain.

Multiple Input Multiple Output (MIMO) schemes use multiple transmission antennas and multiple receive antennas to improve the capacity and reliability of a wireless communication channel. A MIMO system promises linear increase in capacity with K where K is the minimum of number of transmit (M) and receive antennas (N), i.e. K=min(M,N). A simplified example of a 4×4 MIMO system is shown in FIG. 6. In this example, four different data streams are transmitted separately from four transmission antennas. The transmitted signals are received at four receive antennas. Some form of spatial signal processing is performed on the received signals in order to recover the four data streams. An example of spatial signal processing is vertical Bell Laboratories Layered Space-Time (V-BLAST) which uses the successive interference cancellation principle to recover the transmitted data streams. Other variants of MIMO schemes include schemes that perform some kind of space-time coding across the transmission antennas (e.g., diagonal Bell Laboratories Layered Space-Time (D-BLAST)) and also beamforming schemes such as Spatial Division multiple Access (SDMA).

The MIMO channel estimation consists of estimating the channel gain and phase information for links from each of the transmission antennas to each of the receive antennas. Therefore, the channel for M×N MIMO system consists of an N×M matrix:

$$H = \begin{bmatrix} h_{11} & h_{12} & \ldots & h_{1M} \\ h_{21} & h_{22} & \ldots & h_{2M} \\ \vdots & \vdots & \ldots & \vdots \\ h_{N1} & h_{M2} & \ldots & h_{NM} \end{bmatrix} \qquad (8)$$

where $h_{ij}$ represents the channel gain from transmission antenna j to receive antenna i. In order to enable the estimations of the elements of the MIMO channel matrix, separate pilots are transmitted from each of the transmission antennas.

Figure 7:
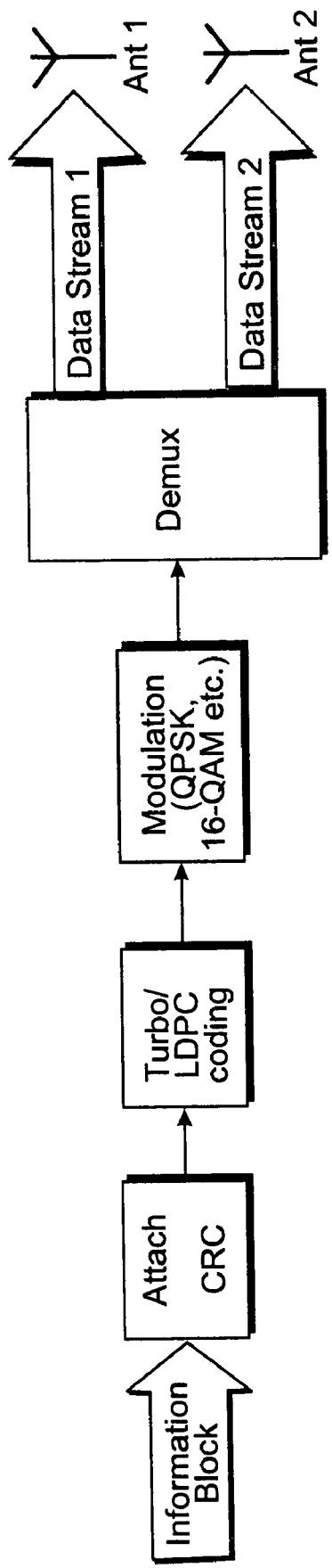
FIG. 7 schematically illustrates a single codeword MIMO transmission scheme.

An example of single-code word MIMO scheme is given in FIG. 7. In case of single-code word MIMO transmission, a cyclic redundancy check (CRC) is added to a single information block and then coding, for example, using turbo codes and low-density parity check (LDPC) code, and modulation, for example, by quadrature phase-shift keying (QPSK) modulation scheme, are performed. The coded and modulated symbols are then demultiplexed for transmission over multiple antennas.

Figure 8:
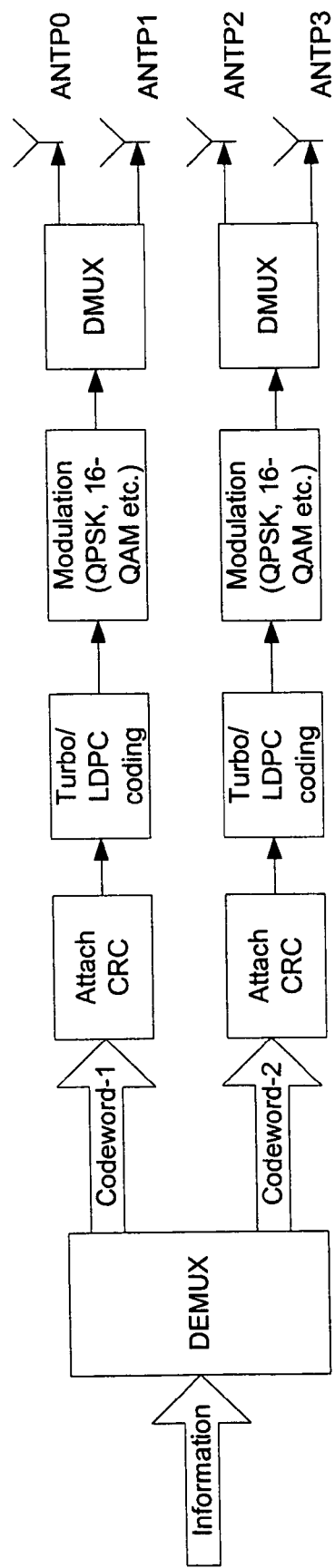
FIG. 8 schematically illustrates a multiple codeword MIMO transmission scheme.

In case of multiple codeword MIMO transmission, shown in FIG. 8, the information block is de-multiplexed into smaller information blocks. Individual CRCs are attached to these smaller information blocks and then separate coding and modulation is performed on these smaller blocks. After modulation, these smaller blocks are respectively demultiplexed into even smaller blocks and then transmitted through corresponding antennas. It should be noted that in case of multi-code word MIMO transmissions, different modulation and coding can be used on each of the individual streams, and thus resulting in a so-called Per Antenna Rate Control (PARC) scheme. Also, multi-code word transmission allows for more efficient post-decoding interference cancellation because a CRC check can be performed on each of the code words before the code word is cancelled from the overall signal. In this way, only correctly received code words are cancelled, and thus avoiding any interference propagation in the cancellation process.

Figure 9:
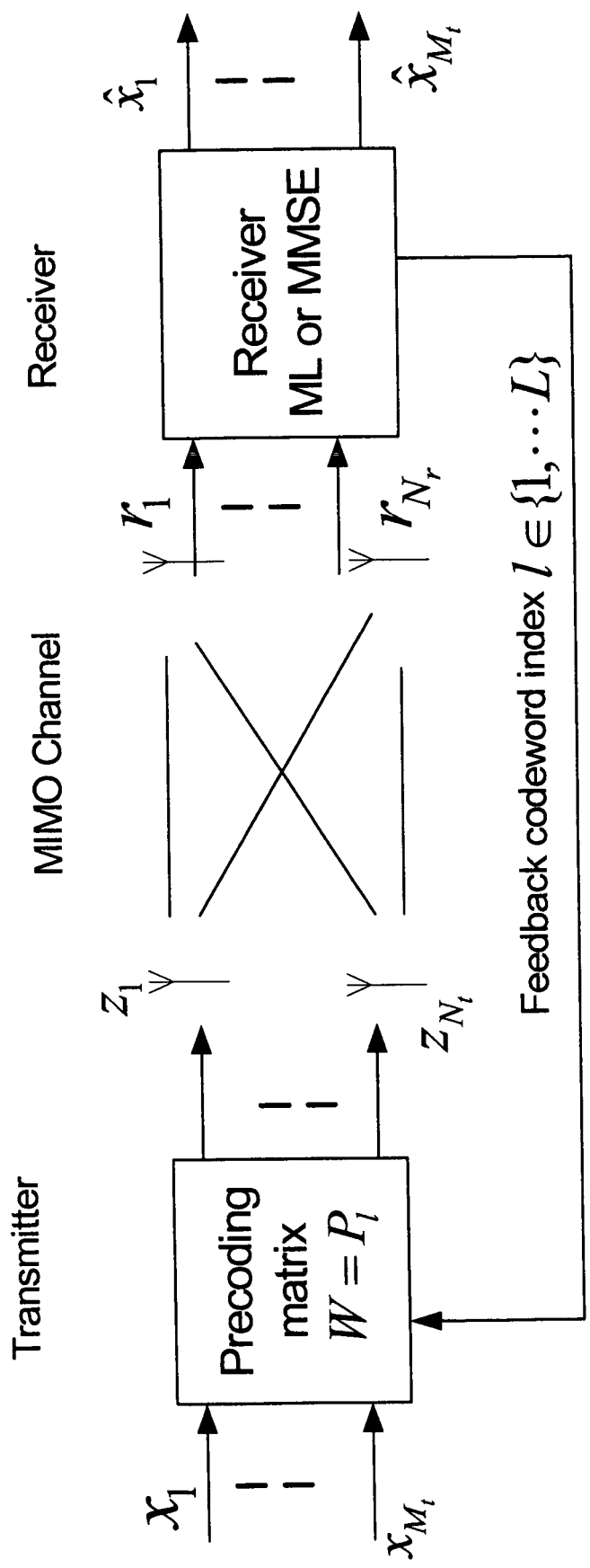
FIG. 9 schematically illustrates a feedback-based MIMO precoding and decoding system.

In a closed-loop MIMO precoding system, for each transmission antenna size we construct a set of precoding matrices (i.e., codewords) and let this set be known at both the Node-B (i.e., the base station) and the user equipment (UE). We call this set of matrices as the "codebook" and denote it $P=\{P_1, \ldots, P_L\}$. Here $L=2^q$ denotes the size of the codebook and q is the number of (feedback) bits needed to index the codebook. In a limited feedback precoding MIMO system illustrated in FIG. 9, once the codebook is specified for a MIMO system, the receiver observes a channel realization, selects the best precoding matrix (i.e., codeword) to be used at the moment, and feeds back the index of the codeword to the transmitter.

An example of precoding is discrete Fourier transform (DFT)-based or Fourier precoding. A Fourier matrix is a N×N square matrix with entries given by:

$$P_N = e^{j2\pi mn/N} \; m,n=0, 1, \ldots (N-1) \qquad (9)$$

For example, a 2×2 Fourier matrix can be expressed as:

$$P_2 = \begin{bmatrix} 1 & 1 \\ 1 & e^{j\pi} \end{bmatrix} = \begin{bmatrix} 1 & 1 \\ 1 & -1 \end{bmatrix} \qquad (10)$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} \qquad (11)$$

$$= \begin{bmatrix} 1 & 1 & 1 & 1 \\ 1 & j & -1 & -j \\ 1 & -1 & 1 & -1 \\ 1 & -j & -1 & j \end{bmatrix}$$

Other forms of precoding include matrices obtained using Householder (HH) equation. An example of a 4×4 Householder matrix is given below:

$$M_1 = I_4 - 2u_1 u_1^H / \|u_1\|^2 = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \qquad (12)$$

where $u_1^T = [1\ -1\ -1\ -1]$.

Figure 10:
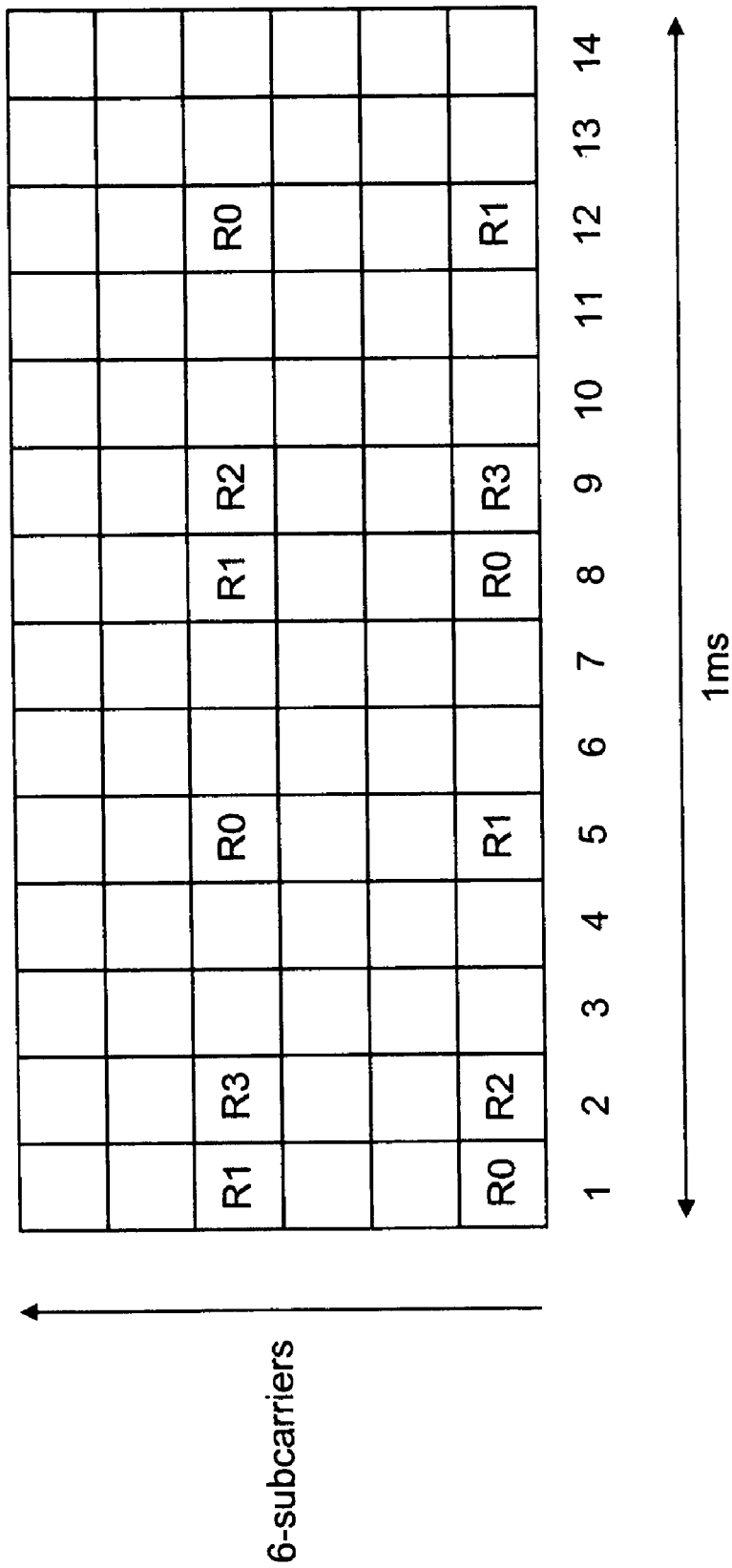
FIG. 10 schematically illustrates an example of mapping of downlink reference signals.

An example of reference signals transmission over six subcarriers within a subframe is shown in FIG. 10. For simplicity, we will assume reference signals transmission over six subcarriers in the remaining of this document.

Figure 11:
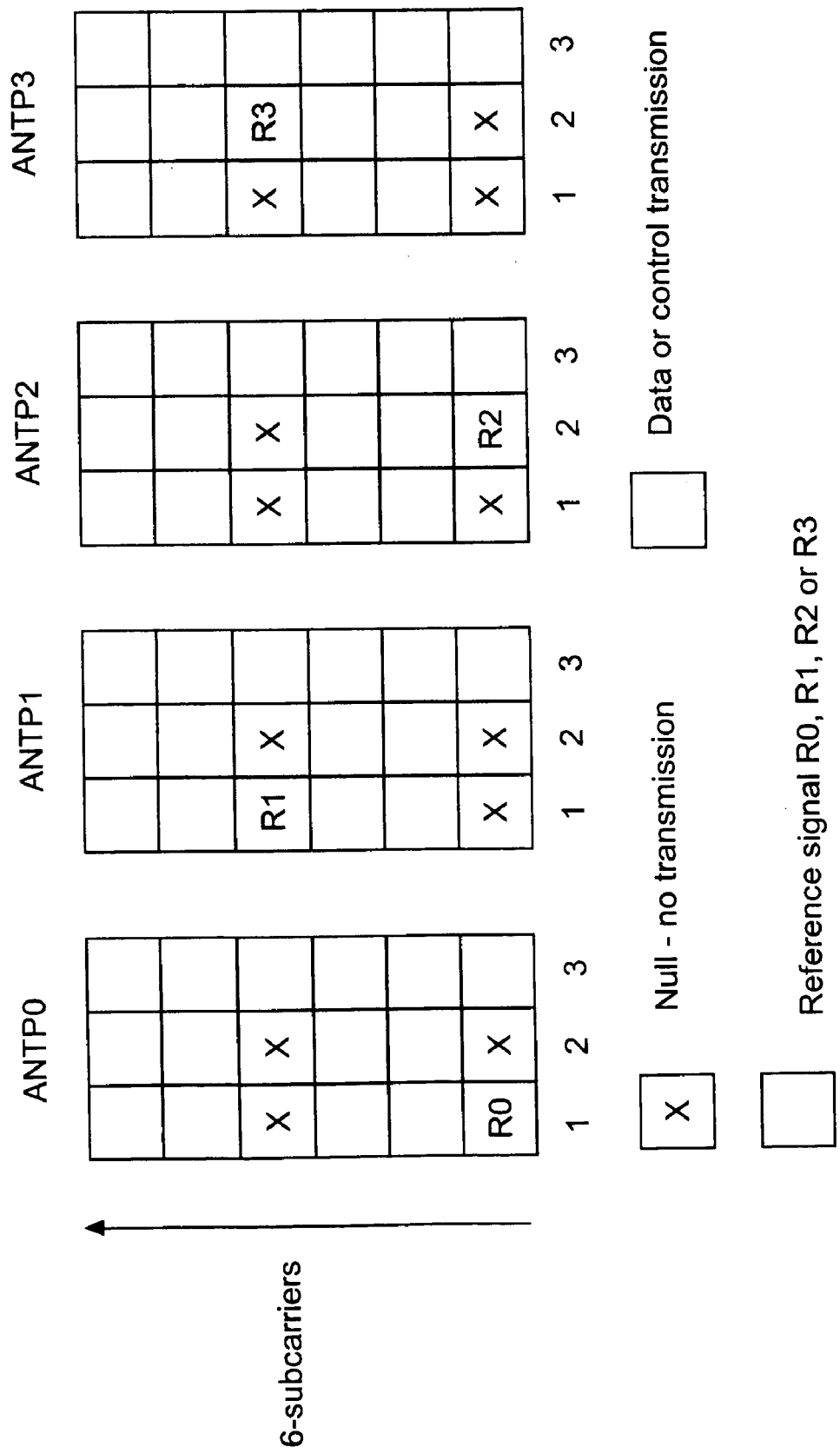
FIG. 11 schematically illustrates an example of mapping of downlink reference signals in OFDM symbols 1 and 2.

An example of reference signals transmission over six subcarriers within the first three OFDM symbols from each of the four antenna ports is shown in FIG. 11. It can be noted that the power available from each antenna port for subcarriers other than the reference signals, e.g., data subcarriers, vary from OFDM symbol to OFDM symbol. Keeping the power level the same across antennas on these subcarriers results in inefficient use of power, because the power level is limited to the minimum power level available from a given antenna port even though other ports may have extra power available. Likewise, keeping the power level the same across OFDM symbols on these subcarriers also results in inefficient use of power, because power level is limited to the minimum power level available in one OFDM symbol although other OFDM symbols may have extra power available. Another solution could be to puncture some data subcarriers in OFDM symbols containing pilots to keep the power level the same across the symbols. This approach, however, may undesirably result in a waste of subcarrier resources thus degrading system performance and capacity.

Figure 12:
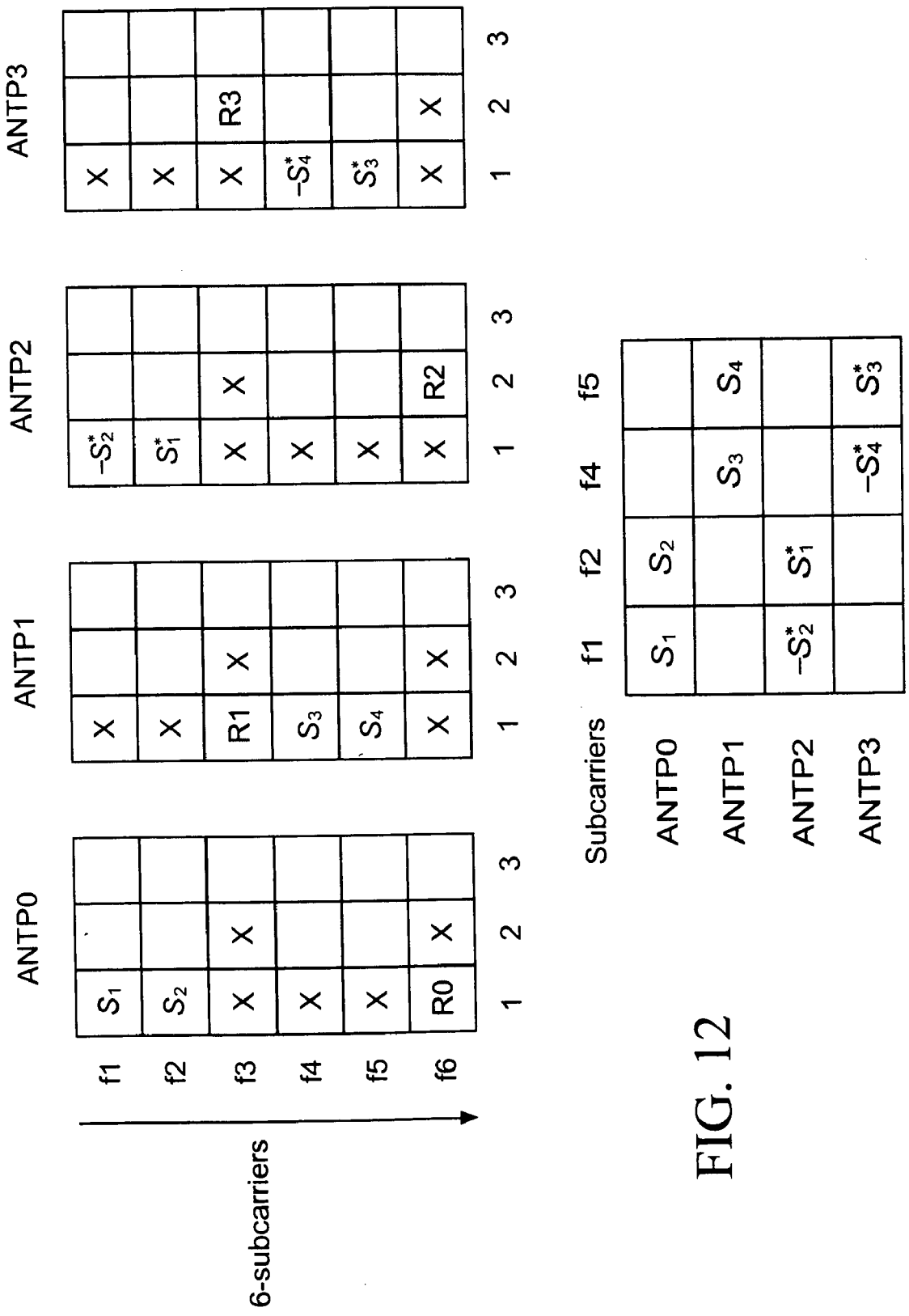
FIG. 12 schematically illustrates a Space Frequency Block Code combined with Frequency Switched Transmit Diversity (SFBC-FSTD) transmission scheme in a first OFDM symbol according to one embodiment of the principles of the present invention.

In a first embodiment according to the principles of the present invention, different power levels are used for data transmission on different antenna ports in each OFDM symbol using a SFBC-FSTD scheme as shown in FIG. 12. The data modulation symbols $S_1$ and $S_2$ are transmitted over antennas ports ANTP 0 and ANTP 2 with respective scaling factors $\alpha_0$ and $\alpha_2$, while symbols $S_3$ and $S_4$ are transmitted over antenna ports ANTP 1 and ANTP 3 with respective scaling factors $\alpha_1$ and $\alpha_3$, as given by the transmit matrix below.

$$T = \begin{bmatrix} T_{11} & T_{12} & T_{14} & T_{15} \\ T_{21} & T_{22} & T_{24} & T_{25} \\ T_{31} & T_{32} & T_{34} & T_{35} \\ T_{41} & T_{42} & T_{44} & T_{45} \end{bmatrix} = \begin{bmatrix} \alpha_0 S_1 & -\alpha_0 S_2^* & 0 & 0 \\ 0 & 0 & \alpha_2 S_3 & -\alpha_2 S_4^* \\ \alpha_1 S_2 & \alpha_1 S_1^* & 0 & 0 \\ 0 & 0 & \alpha_3 S_4 & \alpha_3 S_3^* \end{bmatrix} \qquad (13)$$

where $T_{ij}$ represents the symbol transmitted on the ith antenna port and the jth subcarrier. Note although this mapping from symbols to antenna ports is preferred in LTE system, the techniques disclosed in this invention certainly apply when the mapping of symbols to antenna ports is different. For example, the symbols $S_1$ and $S_2$ could be mapped to antenna ports 0 and 1, while the symbols $S_3$ and $S_4$ could be mapped to antenna ports 2 and 3. In this case, the transmit matrix is given as:

$$T = \begin{bmatrix} \alpha_0 S_1 & -\alpha_0 S_2^* & 0 & 0 \\ \alpha_1 S_2 & \alpha_1 S_1^* & 0 & 0 \\ 0 & 0 & \alpha_2 S_3 & -\alpha_2 S_4^* \\ 0 & 0 & \alpha_3 S_4 & \alpha_3 S_3^* \end{bmatrix} \quad (14)$$

Assuming a power P available per subcarrier, we assume that a total power of 6P is available for transmission over six subcarriers in each OFDM symbol. We also assume that each of the reference signals R0, R, R2 and R3 uses a power of 2P per subcarrier. Since a given antenna port only transmit one reference signal (RS) symbol in every six subcarriers, the antenna port can use the power from subcarrier position allocated for the other antenna port. For example, ANTP0 can use the power for R0 transmission in the first OFDM symbol for subcarrier position f6, and can also use the power for R1 transmission in the first OFDM symbol for subcarrier position f3. We also note that in the SFBC-FSTD scheme, each antenna transmits signal over half the subcarriers while leaving the remaining half of the subcarriers empty. Therefore, power per data modulation symbol using SFBC-FSTD scheme from ANTP0 and ANTP1 in the first OFDM symbol is also 2P. Since no reference signals are transmitted from ANTP2 and ANTP3 in the first OFDM symbol, the power per data modulation symbol from ANTP2 and ANTP3 is 3P. This is because, for each of ANTP2 and ANTP3, a total power of 6P is available for six subcarriers while the transmission happens only on two subcarriers as shown in FIG. 12. In general, the number of subcarriers within an OFDM symbol is quite large. For example, there are six hundred subcarriers in 10 MHz for the LTE system. In this case, there will be 100 groups of six subcarriers each and the same pattern is repeated 100 times. Power P is per subcarrier per OFDM symbol. With 600 subcarriers, the total power within an OFDM symbol would be 600P.

With this assumption on power levels for data symbols from different antenna ports, the ratio between the scaling factors can be written as:

$$\frac{\alpha_2}{\alpha_0} = \frac{\alpha_3}{\alpha_1} = \sqrt{\frac{3P}{2P}} = \sqrt{\frac{3}{2}} \quad (15)$$

The SFBC-FSTD transmission matrix is then given as below:

$$T = \begin{bmatrix} S_1 & -S_2^* & 0 & 0 \\ 0 & 0 & S_3 & -S_4^* \\ \sqrt{3/2}\, S_2 & \sqrt{3/2}\, S_1^* & 0 & 0 \\ 0 & 0 & \sqrt{3/2}\, S_4 & \sqrt{3/2}\, S_3^* \end{bmatrix} \quad (16)$$

Similarly, for the transmit matrix shown in Equation (14), the SFBC-FSTD transmission matrix can be given as:

$$T = \begin{bmatrix} S_1 & -S_2^* & 0 & 0 \\ \sqrt{3/2}\, S_2 & \sqrt{3/2}\, S_1^* & 0 & 0 \\ 0 & 0 & S_3 & -S_4^* \\ 0 & 0 & \sqrt{3/2}\, S_4 & \sqrt{3/2}\, S_3^* \end{bmatrix} \quad (17)$$

This ratio of scaling factors is communicated to the receiver either via explicit signaling or derived at the receiver with knowledge of other parameters for detection, demodulation and decoding of the information transmitted using the SFBC-FSTD scheme.

Channel gains, i.e., antenna gains, are obtained by the receiver using the reference symbols, because reference symbols are pre-known signals. The receiver knows what was transmitted and what is received, and hence the receiver can calculate the channel gains. The channel gains for symbols $S_1$ and $S_2$ are denoted as $g_{12}$, and the channel gains for symbols $S_3$ and $S_4$ are denoted as $g_{34}$. The channel gains $g_{12}$ and $g_{34}$ can be written as below:

$$g_{12} = \left(h_0^2 + \frac{3}{2} h_2^2\right) S_i; \quad i = 1, 2 \quad (18)$$

$$g_{34} = \left(h_1^2 + \frac{3}{2} h_3^2\right) S_i; \quad i = 3, 4$$

where $h_0$, $h_1$, $h_2$ and $h_3$ are channel gains from antenna ports ANTP 0, ANTP 1, ANTP 2 and ANTP 3 respectively.

Figure 13:
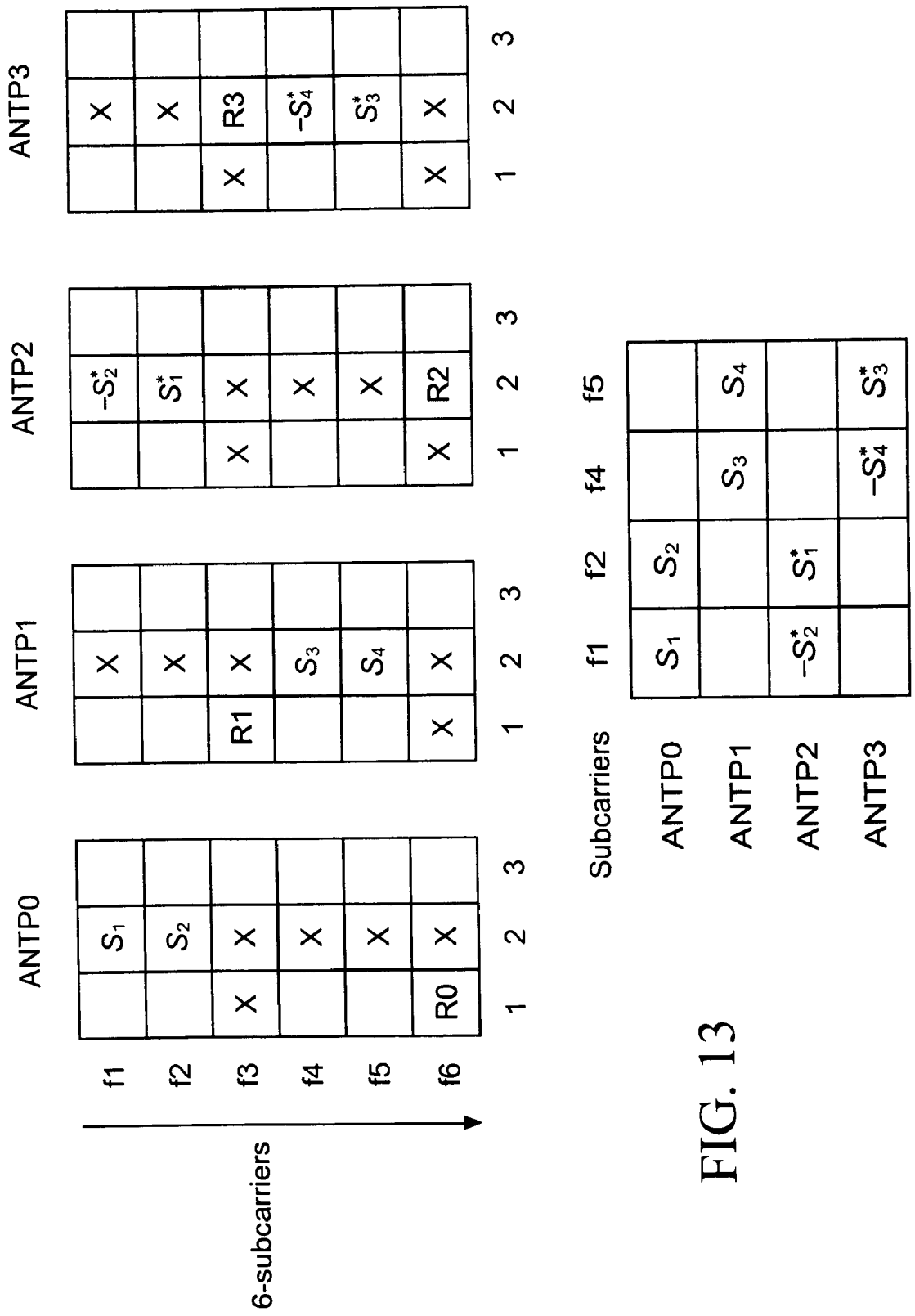
FIG. 13 schematically illustrates a SFBC-FSTD transmission scheme in a second OFDM symbol according to another embodiment of the principles of the present invention.

The SFBC-FSTD transmission in the second OFDM symbol is shown in FIG. 13. The ratio between the scaling factors can be written as:

$$\frac{\alpha_0}{\alpha_2} = \frac{\alpha_1}{\alpha_3} = \sqrt{\frac{3P}{2P}} = \sqrt{\frac{3}{2}} \quad (19)$$

The SFBC-FSTD transmission matrix is then given as below:

$$T = \begin{bmatrix} \sqrt{3/2}\, S_1 & -\sqrt{3/2}\, S_2^* & 0 & 0 \\ 0 & 0 & \sqrt{3/2}\, S_3 & -\sqrt{3/2}\, S_4^* \\ S_2 & S_1^* & 0 & 0 \\ 0 & 0 & S_4 & S_3^* \end{bmatrix} \quad (20)$$

This ratio of scaling factors is communicated to the receiver either via explicit signaling or derived at the receiver with knowledge of other parameters for detection, demodulation and decoding of the information transmitted using the SFBC-FSTD scheme.

Figure 14:
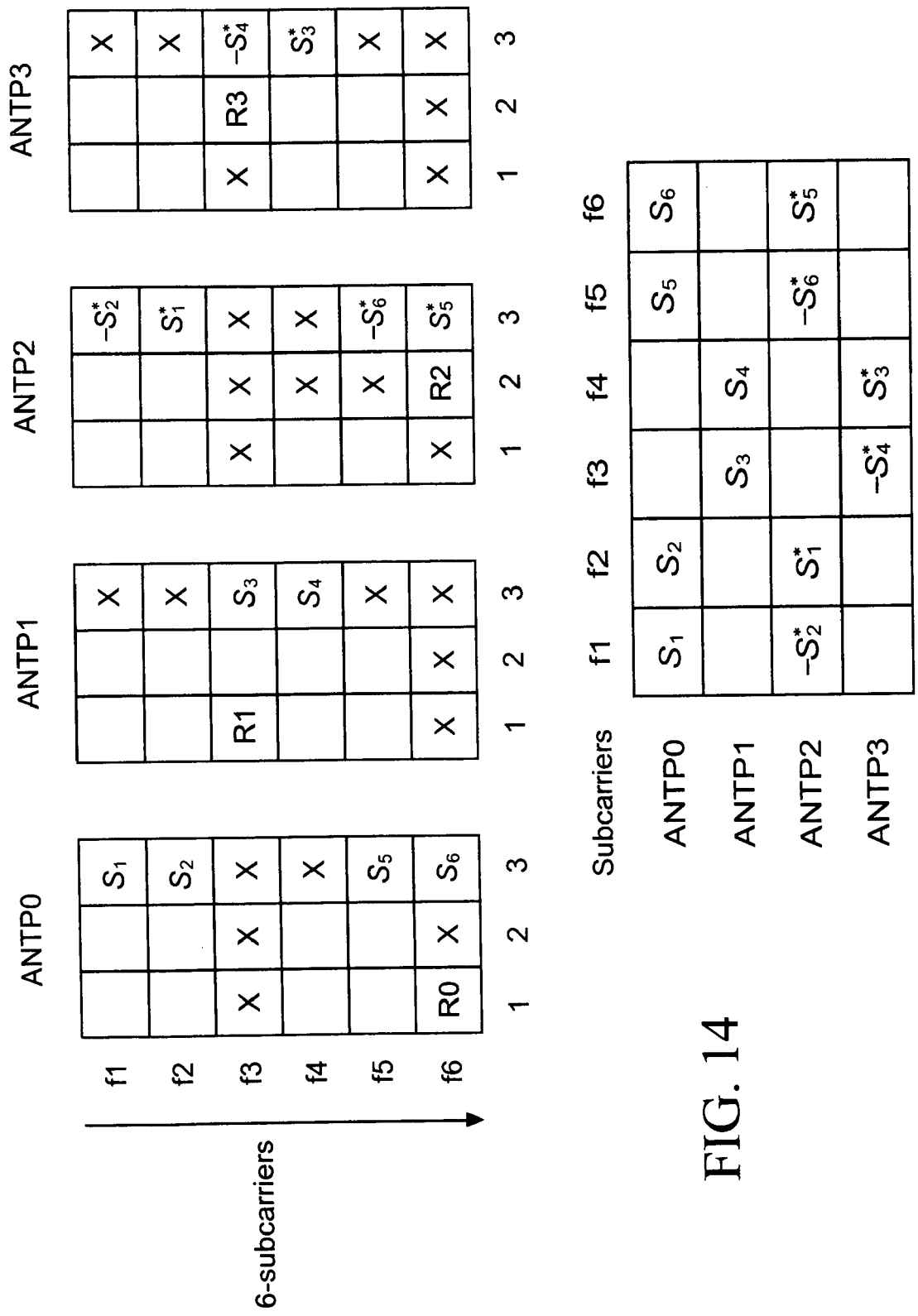
FIG. 14 schematically illustrates a SFBC-FSTD transmission scheme in a third OFDM symbol according to still another embodiment of the principles of the present invention.

The SFBC-FSTD transmission in the third OFDM symbol is shown in FIG. 14. In the third OFDM symbol, there are no reference signals and therefore more data symbols are transmitted. In the third OFDM symbol, a power of 2P is available per antenna per data modulation symbol. As SFBC-FSTD is applied over a set of four subcarriers and six subcarriers are shown in FIG. 14, subcarriers 5 and 6 need to be paired with subcarriers 7 and 8 (not shown). In this case, when subcarriers 7 and 8 are left empty due to the SFBC-FSTD scheme, the power for subcarriers 5 and 6 is 2P. In other words, in the third OFDM symbol, each of subcarriers 1, 2, 5 and 6 has a power of 2p, while each of subcarriers 3, 4, 7 and 8 has zero power. In this case, a total power of 8P is used by the eight subcarriers 1 through 8, even though subcarriers 3, 4, 7 and 8 consume no power. Therefore the ratio between the scaling factors can be written as:

$$\frac{\alpha_0}{\alpha_2} = \frac{\alpha_1}{\alpha_3} = \sqrt{\frac{2P}{2P}} = 1 \quad (21)$$

The SFBC-FSTD transmission matrix is then given as below:

$$T = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix} \quad (22)$$

This ratio of scaling factors is communicated to the receiver either via explicit signaling or derived at the receiver with knowledge of other parameters for detection, demodulation and decoding of the information transmitted using the SFBC-FSTD scheme.

It should be noted that the total power from all the transmission antennas for each of the modulation symbols $S_1$, $S_2$, $S_3$ and $S_4$ in the first and second OFDM symbols is 5P (2P from one antenna and 3P from the other antenna). The power for each of the modulation symbols $S_1$, $S_2$, $S_3$ and $S_4$ in the third OFDM symbol is only 4P. This ratio of data symbol power between different OFDM symbols also need to be known at the receiver for demodulation of higher order modulations such as 16-QAM and 64-QAM. We denote this power ratio as below.

$$\frac{\gamma_1}{\gamma_3} = \frac{\gamma_2}{\gamma_3} = \frac{5P}{4P} = \frac{5}{4}, \quad (23)$$

where $\gamma_1$, $\gamma_2$ and $\gamma_3$ are the power levels per modulation symbol in the OFDM symbols 1, 2 and 3 respectively. This power level ratio is communicated to the receiver for demodulation of higher order modulations such as 16-QAM and 64-QAM.

We described the embodiments of the current invention for transmission in the first, the second and the third OFDM symbols. The first OFDM symbol represents the case where reference signals R0 and R1 are present. The second OFDM symbol represents the case where reference signals R2 and R3 are present. The third OFDM symbol represents the case where no reference signals are present. The remaining OFDM symbols within a subframe are one of these three types and therefore the transmission mechanism in the remaining OFDM symbols follows similar transmission mechanism.

Figure 15:
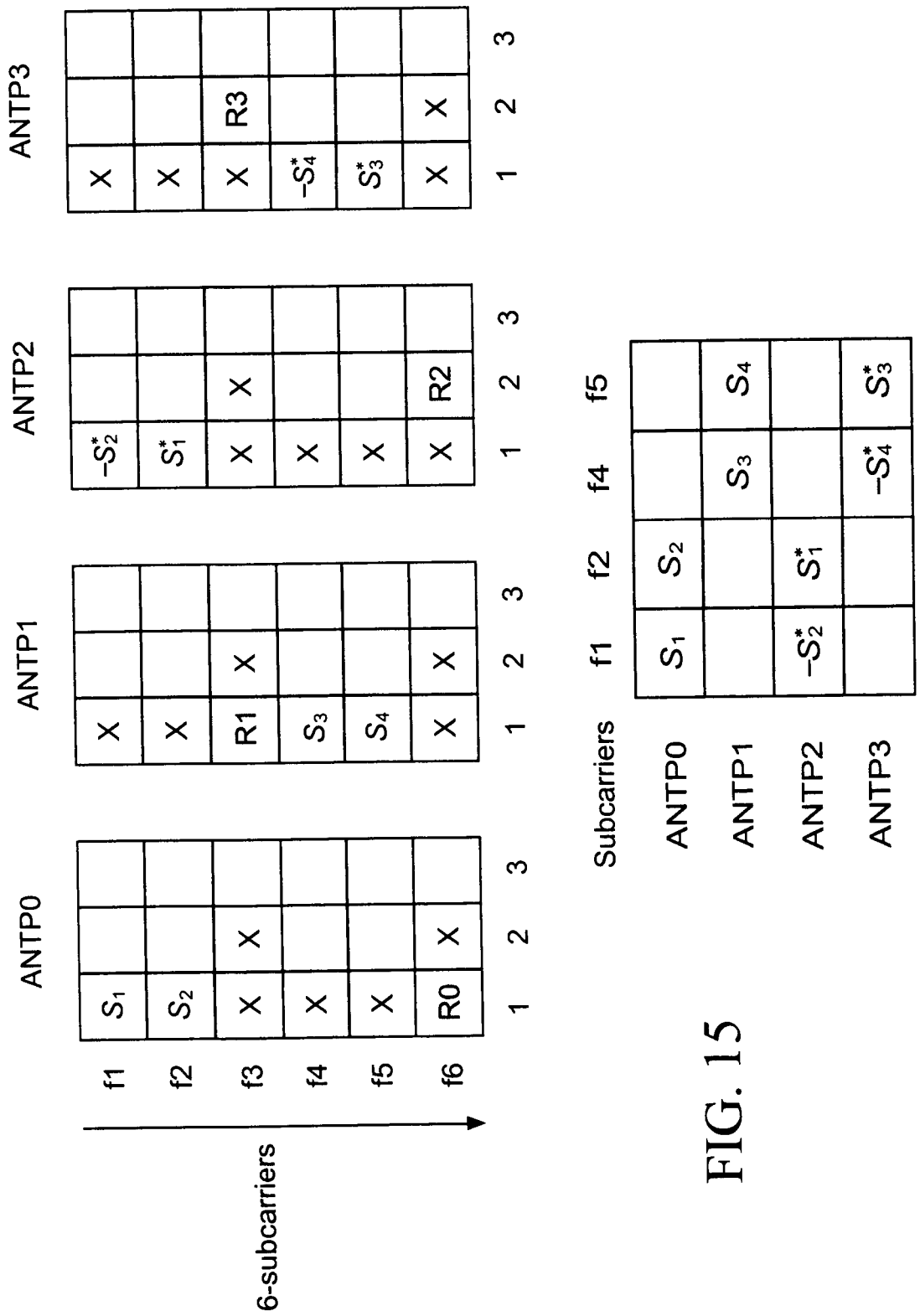
FIG. 15 schematically illustrates a SFBC-FSTD transmission scheme in the first OFDM symbol with reference signal boosting according to a further embodiment of the principles of the present invention.

In a second embodiment according to the principles of the present invention as shown in FIG. 15, reference signals are power boosted relative to data signals. Assuming a power of P available per subcarrier, we assume that a total power of 6P is available for transmission over 6 subcarriers. We also assume that each of the reference signals R0, R1, R2 and R3 uses a power of 4P per subcarrier. Since a given antenna port only transmit one RS symbol over every six subcarriers, the antenna port can use the power from subcarrier position allocated for the other antenna port. For example, ANTP 0 can use the power for R0 transmission in the first OFDM symbol for its subcarrier position f6, and also subcarrier position for R1 (f3). We also note that in the SFBC-FSTD scheme, each antenna transmit over half the subcarriers while leaving the remaining half subcarriers empty. Therefore, the power per data modulation symbol using SFBC-FSTD scheme from ANTP 0 and ANTP 1 in the first OFDM symbol is also P. The two data symbols use a power of 2P while reference signal uses a power of 4P (total power in the six subcarriers is 6P). Since no reference signals are transmitted from ANTP 2 and ANTP 3 in the first OFDM symbol, the power per data modulation symbol from ANTP 2 and ANTP 3 is 3P. This is because a total power of 6P is available for the six subcarriers while the transmission happens only on two subcarriers from ANTP2 and ANTP3 as shown in FIG. 15.

With this assumption on power levels for data symbols from different antenna ports, the ratio between the scaling factors can be written as:

$$\frac{\alpha_2}{\alpha_0} = \frac{\alpha_3}{\alpha_1} = \sqrt{\frac{3P}{P}} = \sqrt{3} \quad (24)$$

The SFBC-FSTD transmission matrix is then given as below:

$$T = \begin{bmatrix} S_1 & -S_2^* & 0 & 0 \\ 0 & 0 & S_3 & -S_4^* \\ \sqrt{3}S_2 & \sqrt{3}S_1^* & 0 & 0 \\ 0 & 0 & \sqrt{3}S_4 & \sqrt{3}S_3^* \end{bmatrix} \quad (25)$$

This ratio of scaling factors is communicated to the receiver either via explicit signaling or derived at the receiver with knowledge of other parameters for detection, demodulation and decoding of the information transmitted using the SFBC-FSTD scheme. The channel gains for symbols $S_1$ and $S_2$ are denoted as $g_{12}$, and the channel gains for symbols $S_3$ and $S_4$ are denoted as $g_{34}$. The channel gains $g_{12}$ and $g_{34}$ can be written as below:

$$g_{12} = (h_0^2 + 3h_2^2)S_i \, i = 1,2$$

$$g_{34} = (h_1^2 + 3h_3^2)S_i \, i = 3,4 \quad (26)$$

where $h_0$, $h_1$, $h_2$ and $h_3$ are channel gains from antenna ports ANTP 0, ANTP 1, ANTP 2 and ANTP 3 respectively.

Figure 16:
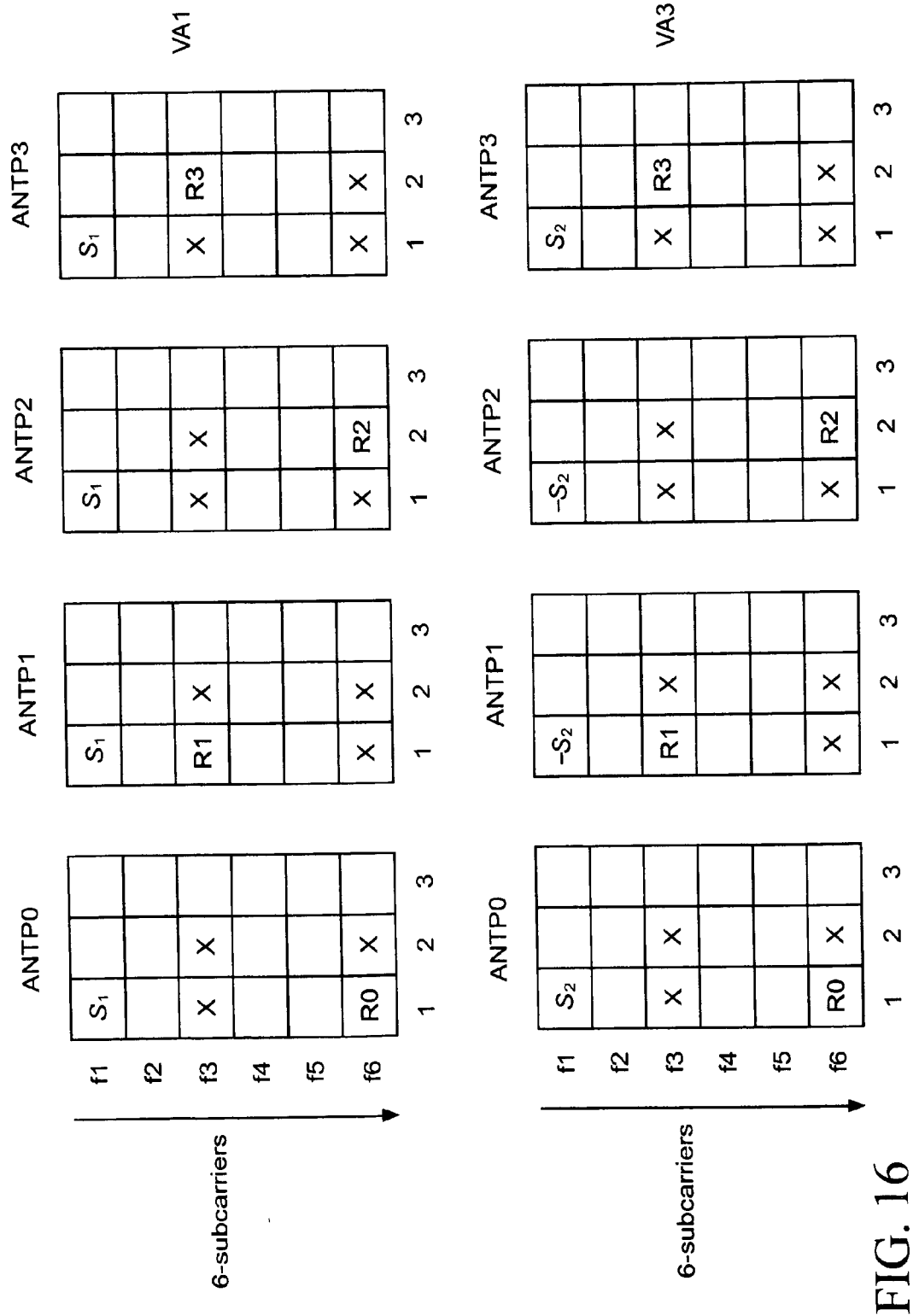
FIG. 16 schematically illustrates transmission of two MIMO layers in a first OFDM symbol on virtual antennas 1 and 3 according to one embodiment of the principles of the present invention.

In a third embodiment according to the principles of the present invention, MIMO spatial multiplexing transmission using precoding can employ different power levels from different antenna ports. Let us assume a two-layer (2-layer) transmission using four transmission antennas (4-Tx). We assume that the first layer ($S_1$) is transmitted on virtual antenna 1 (first column of the Householder (HH) matrix below) and second layer ($S_2$) is transmitted on virtual antenna 3 (third column of the HH matrix below) as shown in FIG. 16.

$$M_1 = I_4 - 2u_1 u_1^H / \|u_1\|^2 = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (27)$$

Figure 17A:
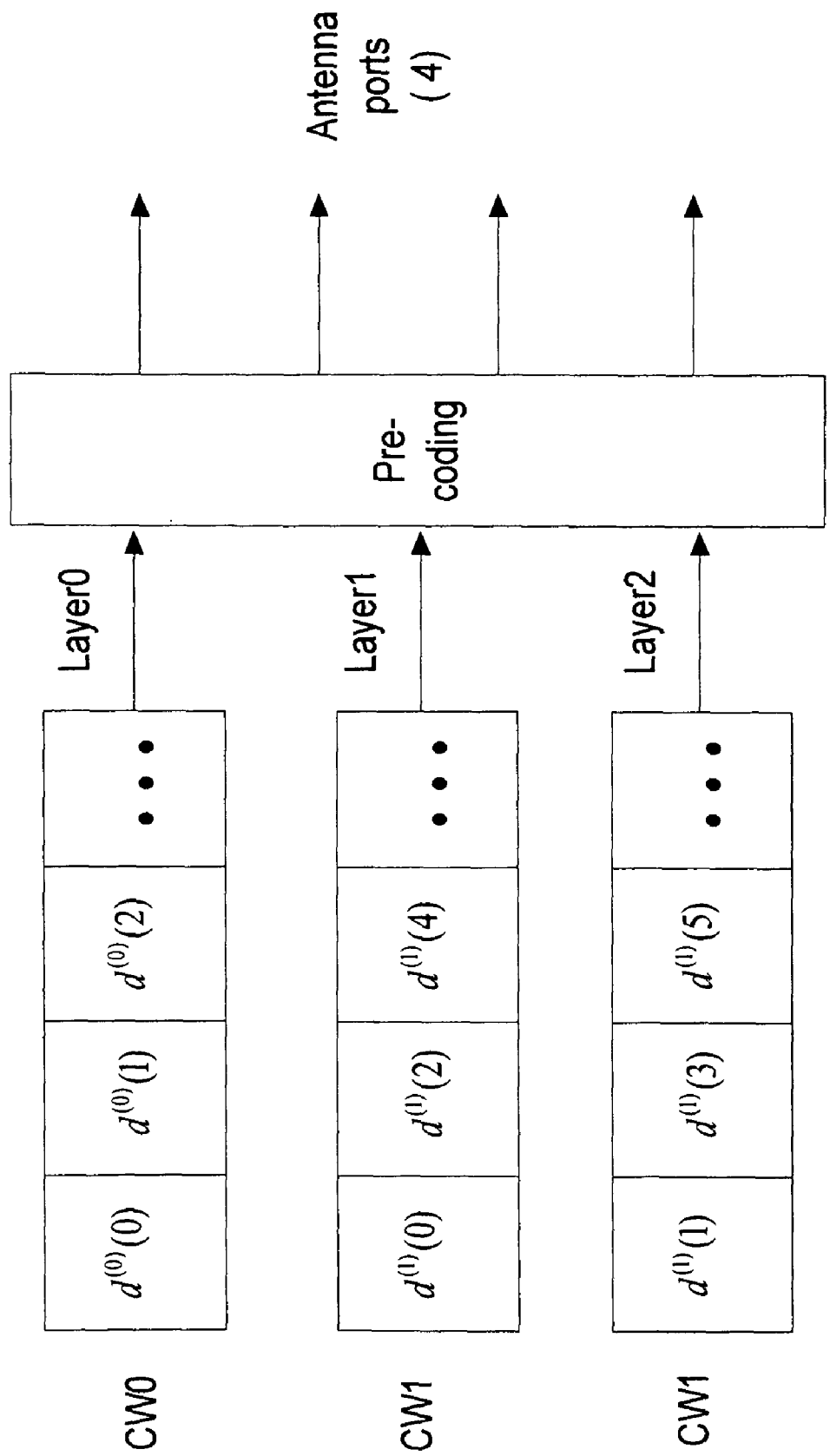
FIGS. 17A and 17B schematically illustrate transmission of multiple MIMO layers using virtual antennas.
Figure 17B:
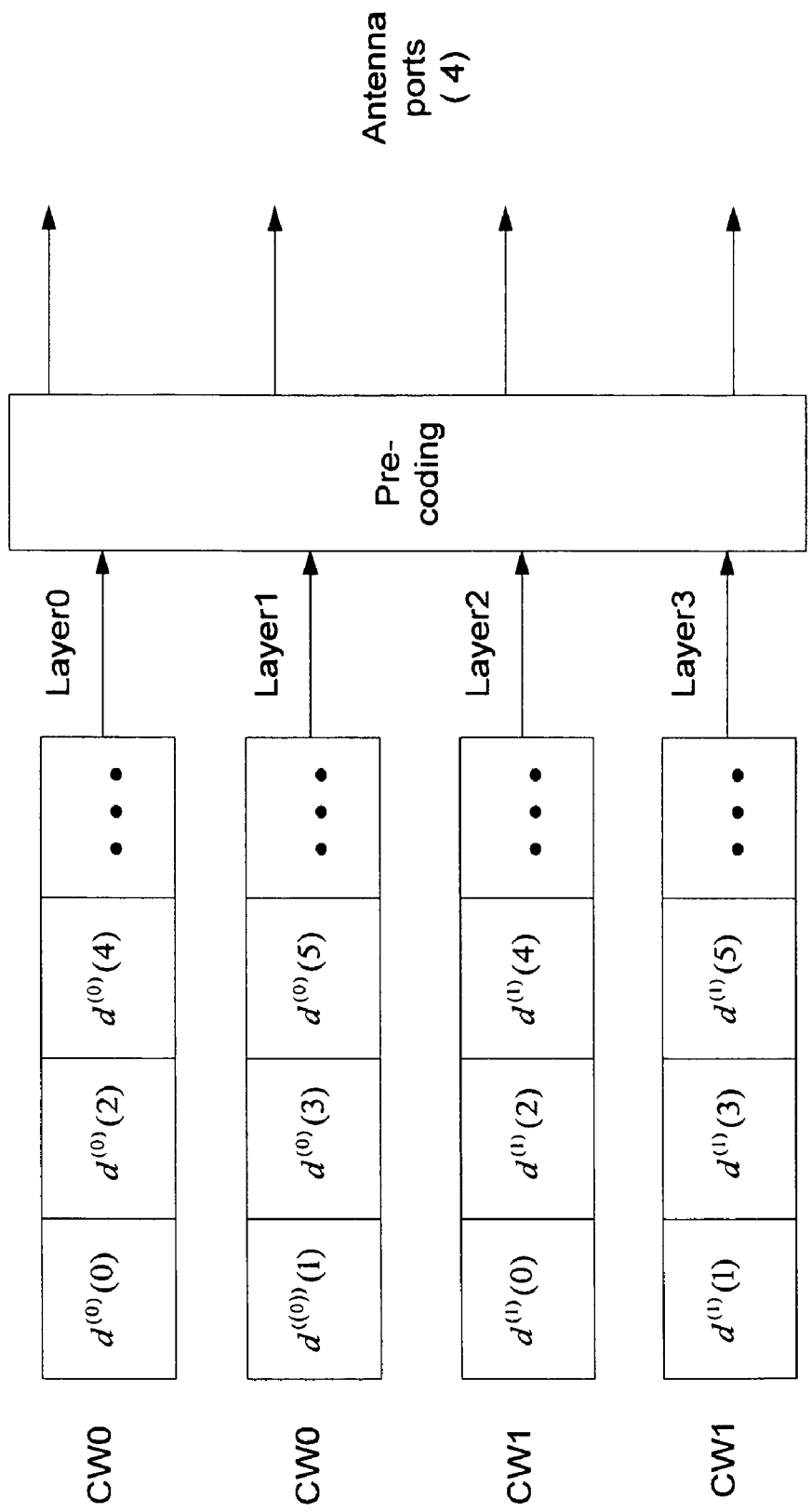

Note that a layer refers to a MIMO stream and there can be multiple modulations symbols within a MIMO stream. The S1 and S2 shown in FIG. 16 refer to the symbols respectively from stream-1 (layer-1) and stream-2 (layer-2). A virtual antenna is obtained by precoding of antenna ports. The relationship between layers and antenna ports is illustrated by FIGS. 17A and 17B. In FIG. 17B with four antenna ports, at the input of precoding, there are four virtual antennas. The number of MIMO layers, however, can be equal to or less than the number of virtual antennas. When the number of layers is less than that of the virtual antennas, a subset of virtual antennas is used with each layer corresponding to a selected virtual antenna.

Let us multiply the first, second, third and fourth rows of $M_1$ by $\alpha_0$, $\alpha_1$, $\alpha_2$ and $\alpha_3$ respectively. This is to account for different power levels used for transmission from different antenna ports with scaling factors $\alpha_0$, $\alpha_1$, $\alpha_2$ and $\alpha_3$ applied to antenna ports ANTP0, ANTP1, ANTP2 and ANTP3 respectively.

$$M_1' = \begin{bmatrix} \alpha_0 \\ \alpha_1 \\ \alpha_2 \\ \alpha_3 \end{bmatrix} \cdot 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (28)$$

$$= 0.5 * \begin{bmatrix} \alpha_0 & \alpha_0 & \alpha_0 & \alpha_0 \\ \alpha_1 & \alpha_1 & -\alpha_1 & -\alpha_1 \\ \alpha_2 & -\alpha_2 & \alpha_2 & -\alpha_2 \\ \alpha_3 & -\alpha_3 & -\alpha_3 & \alpha_3 \end{bmatrix}$$

where A·B represents element by element multiplication of matrix A and matrix B.

The power per data modulation symbol per layer (virtual antenna) from ANTP 0 and ANTP 1 in the first OFDM symbol is P/2. This is obtained by assuming a power of 2P for reference signal subcarrier. Note that unlike the SFBC-FSTD scheme, all the subcarriers are used for transmission with spatial multiplexing. Since no reference signals are transmitted from ANTP 2 and ANTP 3 in the first OFDM symbol, the power per data modulation symbol from ANTP 2 and ANTP 3 is 3/4P. This is because a total power of 6P is available for six subcarriers while the transmission happens only on 4 subcarriers from ANTP 2 and ANTP 3. With this assumption on power levels for data symbols from different antenna ports, the ratio between the scaling factors can be written as:

$$\frac{\alpha_2}{\alpha_0} = \frac{\alpha_3}{\alpha_1} = \sqrt{\frac{3/4P}{P/2}} = \sqrt{\frac{3}{2}} \quad (29)$$

The precoding matrix with antenna ports power scaling for two-layer transmission is then written as:

$$M_1' = 0.5 * \begin{bmatrix} 1 & 0 & 1 & 0 \\ 1 & 0 & -1 & 0 \\ 3/2 & 0 & 3/2 & 0 \\ 3/2 & 0 & -3/2 & 0 \end{bmatrix} \quad (30)$$

The 4×4 Fourier matrix with these power scaling for four layers transmission on virtual antennas 1, 2, 3 and 4 in the first OFDM symbol is written as below:

$$P_4' = \begin{bmatrix} \alpha_0 \\ \alpha_1 \\ \alpha_2 \\ \alpha_3 \end{bmatrix} \cdot 0.5 * \begin{bmatrix} 1 & 1 & 1 & 1 \\ 1 & j & -1 & -j \\ 1 & -1 & 1 & -1 \\ 1 & -j & -1 & j \end{bmatrix} \quad (31)$$

$$= \begin{bmatrix} 1 & 1 & 1 & 1 \\ 1 & j & -1 & -j \\ 3/2 & -3/2 & 3/2 & -3/2 \\ 3/2 & -j3/2 & -3/2 & j3/2 \end{bmatrix}$$

The ratio of these power scaling is communicated to the receiver for MIMO signal demodulation and decoding. This can either be done using control signaling or this information can be derived from other parameters communicated to the receiver. The power scaling can be communicated on a static basis or configured dynamically on a subframe-by-subframe basis. Also, the power scaling ratios can be different for different receivers in a cell.

It should be noted that the total power from all the transmission antennas per modulation symbol in the first and second OFDM symbols is 5/2P (P from one antenna ports 0 and 1 and 3/2P from antenna ports 2 and 3). However, the power per modulation symbol in the third OFDM symbol is only 2P. This ratio of data symbol power between different OFDM symbols also need to be known at the receiver for demodulation of higher order modulations such as 16-QAM and 64-QAM. We denote this power ratio as below.

$$\frac{\gamma_1}{\gamma_3} = \frac{\gamma_2}{\gamma_3} = \frac{\frac{5P}{2}}{2P} = \frac{5}{4} \quad (32)$$

where $\gamma_1$, $\gamma_2$ and $\gamma_3$ are power levels per modulation symbol in OFDM symbol 1, 2 and 3, respectively. This power level ratio is communicated to the receiver for demodulation of higher order modulations such as 16-QAM and 64-QAM.

Figure 18:
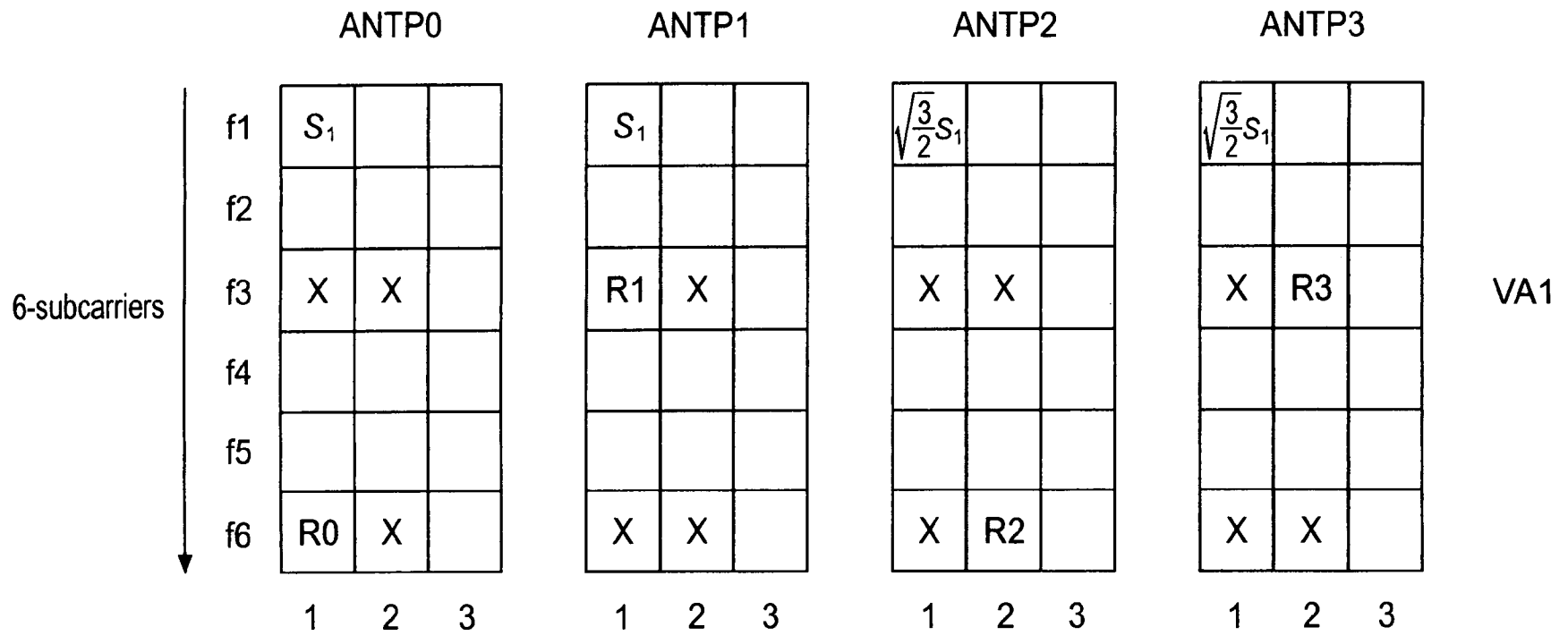

Also the principles of the current invention can be easily extended for transmission of any number of MIMO layers or MIMO streams. An example of rank-1 (a single MIMO layer) transmission using the first column of matrix M, is shown in FIG. 18. The power per data modulation symbol from ANTP 0 and ANTP 1 in the first OFDM symbol is P. This is assuming 2P power for reference signal subcarrier. Note that unlike the SFBC-FSTD scheme, all the subcarriers are used for transmission for rank-1 (a single MIMO layer) transmission. Since no reference signals are transmitted from ANTP 2 and ANTP 3 in the first OFDM symbol, the power per data modulation symbol from ANTP 2 and ANTP 3 is 3/2P. This is because a total power of 6P is available for six subcarriers while the transmission happens only on four subcarriers from ANTP 2 and ANTP 3. With this assumption on power levels for data symbols from different antenna ports, the ratio between the scaling factors can be written as:

$$\frac{\alpha_2}{\alpha_0} = \frac{\alpha_3}{\alpha_1} = \sqrt{\frac{3/4P}{P/2}} = \sqrt{\frac{3}{2}} \quad (33)$$

Figure 19:
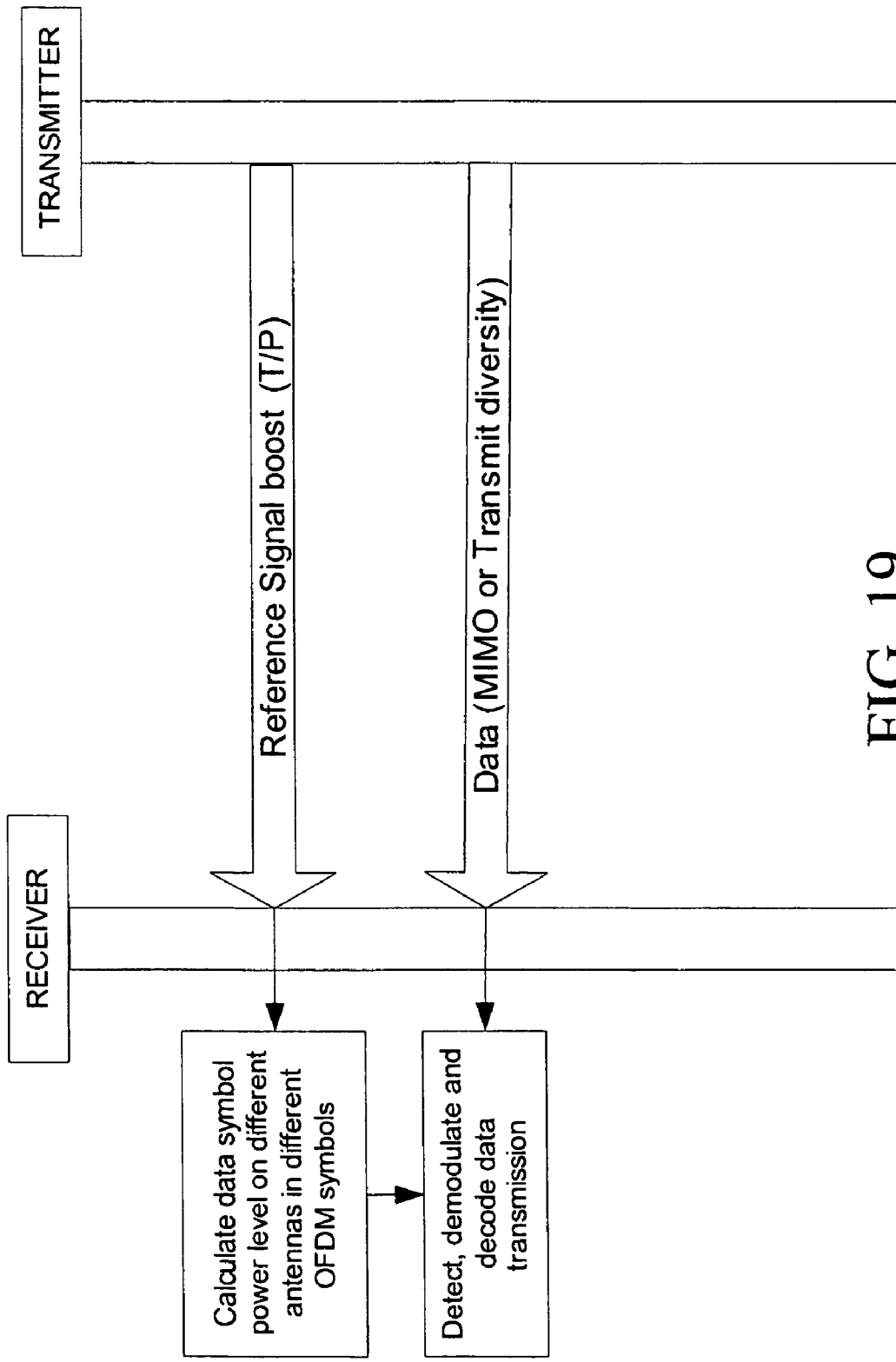
FIG. 19 schematically illustrates an example of antenna power levels calculations at the receiver according to one embodiment of the principles of the present invention.

An example of antenna power levels calculation at the receiver is shown in FIG. 19. The transmitter indicates the traffic to pilot ratio or pilot boost (i.e., power boosting factor) by explicit signaling. Using this information, the receiver derives the power levels from different transmission antennas in different OFDM symbols and demodulates and decodes the received data signals.

Figure 20:
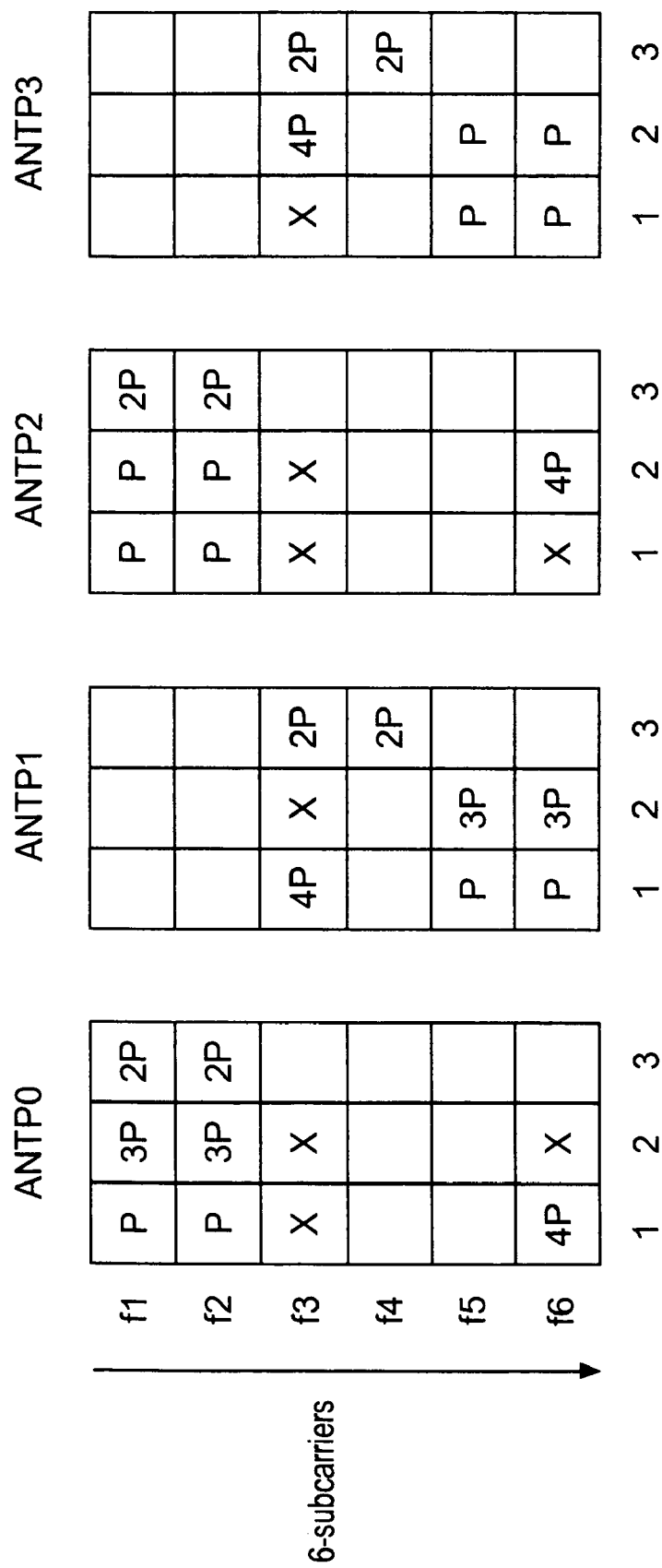
FIG. 20 schematically illustrates a SFBC-FSTD transmission scheme with reference signal boosting according to a further embodiment of the principles of the present invention.
Figure 21:
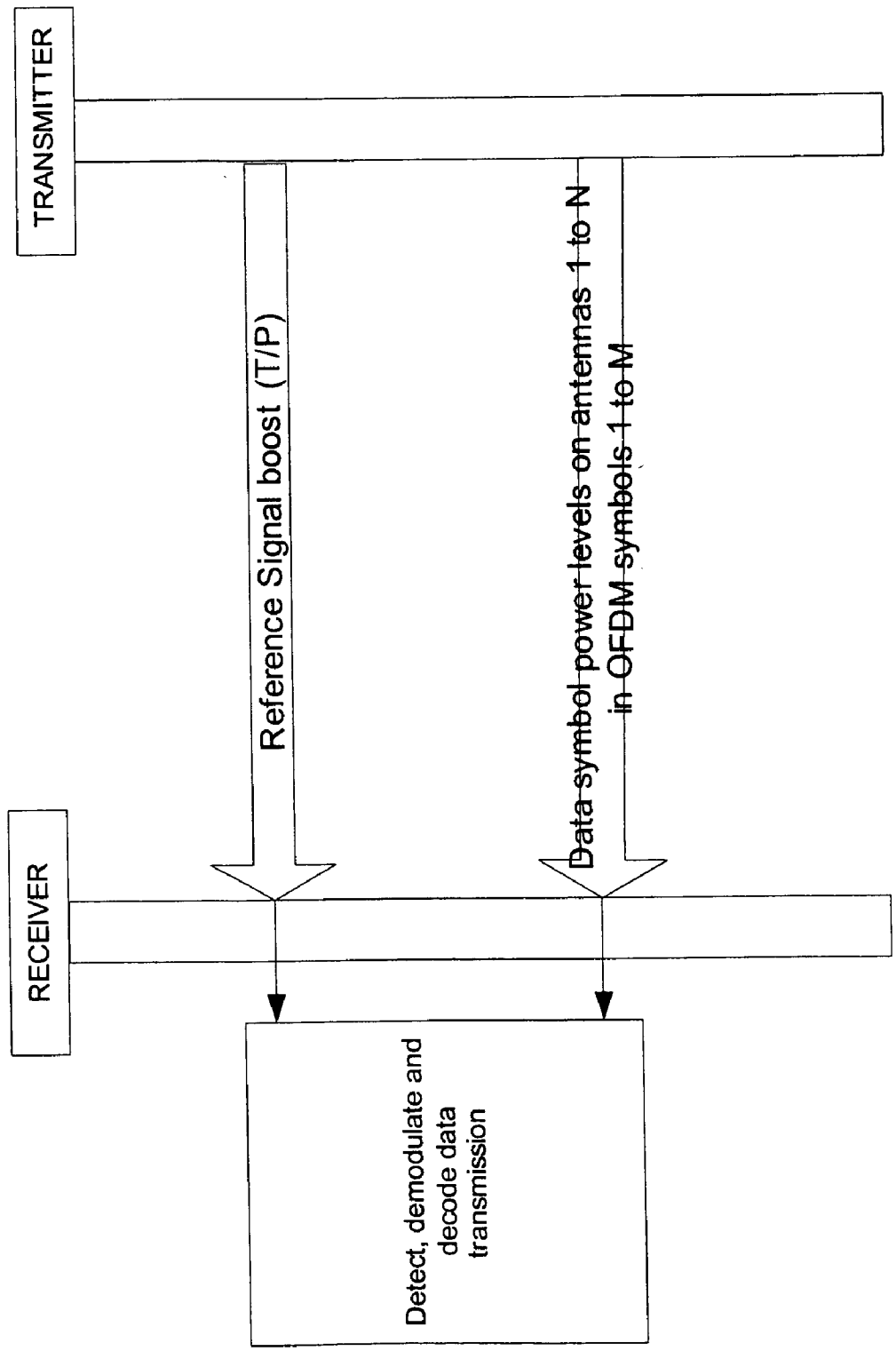
FIG. 21 schematically illustrates an example of antenna power level indication according to one embodiment of the principles of the present invention.

In a fourth embodiment according to the principles of the present invention, an example of 6 dB reference signal (pilot)

boosting is shown in FIG. 20. We assume the boost is relative to the nominal power per subcarrier which is assumed as P. The reference signal symbol is therefore transmitted at a power level of 4P (6 dB boost). When this 6 dB reference signal boost information is indicated to the receiver, the receiver can calculate the power level on the data symbols. Assuming the SFBC-FSTD type of transmission shown in FIG. 20, the receiver can derive the data symbol power level of P, 3P and 2P in the first, second and third OFDM symbols respectively. The receiver knows that when SFBC-FSTD transmission scheme is applied the transmission of symbols form a given antenna only occur on half of the subcarriers. The receiver makes use of this power levels information in demodulating and decoding higher order modulations such as 16-QAM and 64-QAM.

In a fifth embodiment according to the principles of the present invention, in addition to nominal T/P indication, the data symbol power levels on different antennas in different OFDM symbols are communicated to the receiver explicitly. Based on the nominal T/P information and explicit power levels information, the receiver can calculate the actual T/Ps in different OFDM symbols for demodulation and decoding higher order modulations such as 16-QAM and 64-QAM.

In general, in order to maximize the power utilization on multiple OFDM symbols across multiple antennas, the power level of data or other non-RS subcarriers should be derived based on the value of RS power boosting. Assume there are N "usable" subcarriers in the system bandwidth. A subcarrier is "usable" if it can be used to transmit data or control signal, such as reference signal. For example, guard subcarriers and direct current (DC) subcarrier are not "usable" because they are not used in any OFDM symbol for transmission. DC subcarrier is the subcarrier at the zeroth frequency which means a constant. The DC subcarrier is generally not used because it introduces a DC bias in the signal. Assume the total power that can be utilized is $P_{total}$, then the nominal power spectral density (nominal PSD) on each subcarrier is $P_{nom}=P_{total}/N$. In OFDM symbol k, let's assume there are $N_{RS}^k$ subcarriers used by reference signal, and the PSD for the reference signal is $P_{RS}^k$. The power boosting factor for the reference signal in this OFDM symbol is $\alpha_{RS}^k = P_{RS}^k/P_{nom}$. Note that normally the PSD for RS is the same across OFDM symbols, i.e., $P_{RS}^k$ is constant for any OFDM symbol k. In other words, $\alpha_{RS}^i = \alpha_{RS}^j = \alpha_{RS}$. Let's assume there are $N_{idle}^k$ "usable" subcarriers are unused in OFDM symbol k. Note that a "usable" subcarrier is idle means no signal is transmitted in that subcarrier from any antenna. This notion is introduced to accommodate the case that different number of subcarriers is used in different OFDM symbols. If a subcarrier is not used in all OFDM symbols, such as the DC subcarrier or guard subcarriers, it simply results in a smaller number "usable" subcarriers, N, without invoking different $N_{idle}^k$ for different OFDM symbols. The definition of an idle subcarrier is also to be differentiated from the subcarriers in SFBC-FSTD that are used by some antennas but not by other antennas. For example, as shown in FIG. 12, subcarrier f1 and f2 are not used by ANTP1 or ANTP3, but used by ANTP0 and ANTP2. For the sake of simplicity, we assume all subcarriers other than the RS and unused subcarriers are used by data, although the techniques described clearly apply when some or all of these subcarriers are used by control signals. Denote the number of data subcarriers in OFDM symbol k by $N_{data}^k$, we have $$N_{RS}^k + N_{idle}^k + N_{data}^k = N, \text{ or } N_{data}^k = N - N_{RS}^k - N_{idle}^k. \quad (34)$$

The $N_{data}^k$ subcarriers used by data in OFDM symbol k can be assigned to multiple packet transmissions, each occupying a number of subcarriers and targeting one or multiple receivers. Multiple packets may be transmitted in one subframe. The modulation symbols of each packet will occupy a portion of each OFDM symbol of that subframe. Assume there are M packets transmitted in OFDM symbol k, each with $N_m^k$ subcarriers, thus we have $$\sum_{m=1}^{M} N_m^k = N_{data}^k. \quad (35)$$

Due to power control, the power level of the packet transmissions within the same sub-frame may not be the same. For example, the transmitter may use higher power for a packet transmission with high data rate or intended to reach a receiver far away from the transmitter than the power level for a packet transmission with low data rate or intended to reach a receiver close to the transmitter. Denote the power level of the m-th packet transmission as $P_m^k$. For a single transmitter antenna system, we have $$P_{RS}^k N_{RS}^k + \sum_{m=1}^{M} P_m^k N_m^k = P_{total}. \quad (36)$$

In order to achieve full power utilization in OFDM symbol i and OFDM symbol j, $$P_{RS}^i N_{RS}^i + \sum_{m=1}^{M} P_m^i N_m^i = P_{total} \quad (37)$$

and $$P_{RS}^j N_{RS}^j + \sum_{m=1}^{M} P_m^j N_m^j = P_{total}.$$

Define the boosting factor for data subcarriers for packet transmission m in OFDM symbol k to be $\beta_m^k$. We can rewrite the equations as:

$$\alpha_{RS}^i N_{RS}^i + \sum_{m=1}^{M} \beta_m^i N_m^i = N \quad (38)$$

and $$\alpha_{RS}^j N_{RS}^j + \sum_{m=1}^{M} \beta_m^j N_m^j = N.$$

Also note that, $$N_{RS}^i + N_{idle}^i + \sum_{m=1}^{M} N_m^i = N \quad (39)$$

and $$N_{RS}^j + N_{idle}^j + \sum_{m=1}^{M} N_m^j = N.$$

Define the bandwidth ratio for packet transmission m between OFDM symbol i and OFDM symbol j as $$\eta_m(i, j) = \frac{N_m^i}{N_m^j}. \quad (40)$$

Define the PSD ratio for packet transmission m between OFDM symbol i and OFDM symbol j as $$\gamma_m(i,j) = \frac{\beta_m^i}{\beta_m^j}. \qquad (41)$$

In a sixth embodiment according to the principles of the present invention, we maintain a fixed bandwidth ratio between OFDM symbol i and j among multiple packet transmissions. We also maintain a fixed PSD ratio between OFDM symbol i and j among multiple packet transmissions. As a preferred implementation of this technique, we maintain constant bandwidth and power ratio for all packet transmissions. In other words, $\eta_m(i,j)=\eta(i,j)$, and $\gamma_m(i,j)=\gamma(i,j)$ for any $m=1, 2, \ldots, M$. It can be shown that in order to achieve full power and bandwidth utilization, we need to set the bandwidth ratio and power ratio as follows, $$\eta(i,j) = \frac{N - N_{RS}^i - N_{idle}^i}{N - N_{RS}^j - N_{idle}^j}, \qquad (42)$$

$$\gamma(i,j) = \frac{N - \alpha_{RS}^i N_{RS}^i}{N - \alpha_{RS}^j N_{RS}^j} \cdot \frac{1}{\eta(i,j)}. \qquad (43)$$

Equation (40) and (41) can be used to derive the bandwidth and power ratio for a single transmission antenna system. Although this invention certainly applies when there are at least one packet transmission following this bandwidth and power ratio while others do not, it is preferred that the bandwidth and power ratio are followed by all M packet transmissions. By doing so, the power in both OFDM symbol i and OFDM symbol j can be fully utilized. If this bandwidth ratio and power ratio are adopted for all OFDM symbols, the power in all OFDM symbols can be fully utilized. Note that the condition for $\eta(i,j)$, Equation (40) can be fulfilled if the RS subcarriers are regularly spaced in frequency and the resource assignment for each packet transmission is also of regular shape, which is normally the case in LTE systems. The RS density $N_{RS}^i$ and $N_{RS}^j$, and RS boosting factors $\alpha_{RS}^i$ and $\alpha_{RS}^j$ are often static system information. Once this information is known, the receivers can derive the power ratio $\gamma(i,j)$ without additional signaling from the transmitter.

The different power level of the same packet transmission can be represented by the traffic-to-nominal-PSD-ratio (TNPR) in different OFDM symbols. For example, the data subcarrier TNPR can be calculated for OFDM symbol k as $$\rho_k = \frac{N - \alpha_{RS}^k N_{RS}^k}{N - N_{RS}^k - N_{idle}^k}. \qquad (44)$$

The power ratio between two OFDM symbols can be obtained by comparing the nominal data subcarrier TPR in these two OFDM symbols. Alternatively, since the RS power boosting factor is known, this information can be represented and communicated by a nominal traffic-to-pilot-ratio (TPR) for OFDM symbol k as $$\sigma_k = \frac{1}{\alpha_{RS}^k} \cdot \frac{N - \alpha_{RS}^k N_{RS}^k}{N - N_{RS}^k - N_{idle}^k}. \qquad (45)$$

In the following description, we will further elaborate this technique with some special cases and examples.

If all subcarriers are utilized, $N_{Unused}^i=0$, and $N_{Unused}^j=0$. In that case, $$\eta(i,j) = \frac{N - N_{RS}^i}{N - N_{RS}^j}, \qquad (46)$$

$$\gamma(i,j) = \frac{N - \alpha_{RS}^i N_{RS}^i}{N - \alpha_{RS}^j N_{RS}^j} \cdot \frac{N - N_{RS}^j}{N - N_{RS}^i}. \qquad (47)$$

In LTE systems, there are no RS in some OFDM symbols, thus $N_{RS}^j=0$ for those OFDM symbols. In that case, the bandwidth ratio $\eta(i,j)$ and the power ratio $\gamma(i,j)$ can be simplified as $$\eta(i,j) = \frac{N - N_{RS}^i}{N}, \qquad (48)$$

$$\gamma(i,j) = \frac{N - \alpha_{RS}^i N_{RS}^i}{N - N_{RS}^i}. \qquad (49)$$

The technique described can be extended to a system with multiple transmission antennas. Note that in this case, if one subcarrier is used by the RS of one antenna (or antenna port), other antennas (or antenna ports) should not use that subcarrier. Assume the number of subcarriers used by the t-th antenna in the k-th OFDM symbol is $N_{RS}^{k,t}$, then the total number of subcarriers used by RS in the k-th OFDM symbol is $$N_{RS}^k = \sum_{t=1}^{T} N_{RS}^{k,t}, \qquad (50)$$

where T is the total number of transmission antennas. Assume the PSD for the reference signal is $P_{RS}^{k,t}$. The power boosting factor for the reference signal in this OFDM symbol is $\alpha_{RS}^{k,t}=P_{RS}^{k,t}/P_{nom}$. Note that normally the PSD for RS is the same for all antennas across OFDM symbols, i.e., $P_{RS}^{k,t}$ is constant for any OFDM symbol k across all antennas. In other words, $\alpha_{RS}^{i,t}=\alpha_{RS}^{j,s}=\alpha_{RS}$ for $i, j=1, 2, \ldots, M$, and $t, s=1, 2, \ldots, T$. Similar to the case with single transmission antenna, we assume all subcarriers other than the RS and unused subcarriers are used by data for illustration purpose, although the techniques described clearly apply when some or all of these subcarriers are used by control signals. Denote the total number of data subcarriers in OFDM symbol k by $N_{data}^k$, we have:

$$N_{RS}^k + N_{idle}^k + N_{data}^k = N, \text{ or } N_{data}^k = N - N_{RS}^k - N_{idle}^k. \qquad (51)$$

Denote the number of subcarriers used for the m-th packet transmission as $N_m^k$, we have $$\sum_{m=1}^{M} N_m^k = N_{data}^k. \qquad (52)$$

Among the data subcarriers assigned to the m-th packet transmission in the k-th OFDM symbol, we further assume $N_m^{k,t}=N_m^{k,s}$ for any antenna t and s. Note that for some multi-antenna transmission scheme, not all of the $N_m^k$ subcarriers assigned to the m-th packet transmission are fully used on each antenna. For example, in the case of SFBC-FSTD, each antenna only uses half of the subcarriers (See FIG. 12). Thus $N_m^{k,t}=N_m^{k,s}=N_m^k/2$ in that case. Likewise, we can obtain the relationship between the actual number of subcarriers used by each antenna and the number of subcarriers assigned for a packet transmission for other transmission schemes. For example, for SFBC or precoding with constant modulus (CM) property, $N_m^{k,t}=N_m^{k,s}=N_m^k$; For ¾-rate orthogonal SFBC, $N_m^{k,t}=N_m^{k,t}=N_m^{k,s}=3N_m^k/4$. Denote the bandwidth utilization ratio of the m-th packet transmission on OFDM symbol k as $\mu_m^k$, thus we have $N_m^{k,t}=N_m^{k,s}=\mu_m^k N_m^k$. Normally, a single transmission scheme is used across OFDM symbols for the same packet transmission, which leads to $\mu_m^k=\mu_m$ for k=1, 2, ..., M. In any case, the number of subcarriers used by each antenna is the same, but not necessarily equal to the number of subcarriers assigned for a transmission.

Denote the power level of the m-th packet transmission at antenna t in OFDM symbol k as $P_m^{k,t}$. For transmission antenna t in OFDM symbol k, in order to full utilize the transmission power, we have:

$$P_{RS}^{k,t} N_{RS}^{k,t} + \sum_{m=1}^{M} P_m^{k,t} N_m^{k,t} = P_{total}. \quad (53)$$

In order to achieve full power utilization for antenna t in OFDM symbol i and antenna s in OFDM symbol j, we have:

$$P_{RS}^{i,t} N_{RS}^{i,t} + \sum_{m=1}^{M} P_m^{i,t} N_m^{i,t} = P_{total} \quad (54)$$

$$\text{and } P_{RS}^{j,s} N_{RS}^{j,s} + \sum_{m=1}^{M} P_m^{j,s} N_m^{j,s} = P_{total}.$$

Define the boosting factor for data subcarriers for packet transmission m on antenna t in OFDM symbol k to be $\beta_m^{k,t}$. We can rewrite the equations as:

$$\alpha_{RS}^{i,t} N_{RS}^{i,t} + \sum_{m=1}^{M} \beta_m^{i,t} N_m^{i,t} = N \quad (55)$$

$$\text{and } \alpha_{RS}^{j,s} N_{RS}^{j,s} + \sum_{m=1}^{M} \beta_m^{j,s} N_m^{j,s} = N.$$

Also note that:

$$N_{RS}^i + N_{idle}^i + \sum_{m=1}^{M} N_m^i = N \quad (56)$$

$$\text{and } N_{RS}^j + N_{idle}^j + \sum_{m=1}^{M} N_m^j = N.$$

Define the bandwidth ratio for packet transmission m between antenna t in OFDM symbol i and antenna s in OFDM symbol j as:

$$\eta_m^{t,s}(i,j) = \frac{N_m^{i,t}}{N_m^{j,s}} = \frac{\mu_m^i N_m^i}{\mu_m^j N_m^j} = \frac{\mu_m N_m^i}{\mu_m N_m^j} = \frac{N_m^i}{N_m^j} = \eta_m(i,j). \quad (57)$$

Note that the bandwidth ratio is not a function of antenna because we assumed $N_m^{k,t}=N_m^{k,s}$ for any antenna t and s.

Define the PSD ratio for packet transmission m between antenna t in OFDM symbol i and antenna s in OFDM symbol j as:

$$\gamma_m^{t,s}(i,j) = \frac{\beta_m^{i,t}}{\beta_m^{j,s}}. \quad (58)$$

In a seventh embodiment according to the principles of the present invention, we maintain a fixed bandwidth ratio between OFDM symbol i and j among multiple packet transmissions. We also maintain a fixed PSD ratio between antenna t in OFDM symbol i and antenna s in OFDM symbol j among multiple packet transmissions. As a preferred implementation of this technique, we maintain constant bandwidth ratio and power ratio for all packet transmissions. In other words, $\eta_m(i,j)=\eta(i,j)$, and $\gamma_m^{t,s}(i,j)=\gamma^{t,s}(i,j)$ for any m=1, 2, ..., M, and any t, s=1, 2, ..., T. It can be shown that in order to achieve full power and bandwidth utilization, we need to set the bandwidth ratio and power ratio as follows, $$\eta(i,j) = \frac{N - N_{RS}^i - N_{idle}^i}{N - N_{RS}^j - N_{RS}^j}, \quad (59)$$

$$\gamma^{t,s}(i,j) = \frac{N - \alpha_{RS}^{i,t} N_{RS}^{i,t}}{N - N_{RS}^i - N_{idle}^i} \bigg/ \frac{N - \alpha_{RS}^{j,s} N_{RS}^{j,s}}{N - N_{RS}^j - N_{idle}^j} \quad (60)$$

$$= \frac{N - \alpha_{RS}^{i,t} N_{RS}^{i,t}}{N - \alpha_{RS}^{j,s} N_{RS}^{j,s}} \cdot \frac{1}{\eta(i,j)}.$$

Equation (48), (57), and (58) can be used to derive the bandwidth and power ratio for a packet transmission in a multiple antenna system. By using the same formula at the transmitter and receiver side, no extra signaling is needed to exchange the power ratio information between the transmitter and receiver. Although this invention certainly applies when there are at least one packet transmission following this bandwidth and power ratio while others do not, it is preferred that the bandwidth and power ratio are followed by all M packet transmissions. By doing so, the power on both antenna t in OFDM symbol i and antenna s in OFDM symbol j can be fully utilized. If this bandwidth ratio and power ratio are applied to all antennas in all OFDM symbols, the power on all antennas in all OFDM symbols can be fully utilized. Note that the condition for $\eta(i,j)$, Equation (57) can be fulfilled if the RS subcarriers are regularly spaced in frequency and the resource assignment for each packet transmission is also of regular shape, which is normally the case in LTE systems. The RS density $N_{RS}^i$ and $N_{RS}^j$, and RS boosting factors $\alpha_{RS}^{i,t}$ and $\alpha_{RS}^{j,s}$ are often static system information. Once this information is known, the receivers can derive the power ratio $\gamma^{t,s}(i,j)$ without additional signaling from the transmitter.

The different power level of the same packet transmission can be represented by the traffic-to-nominal-PSD-ratio (TNPR) in different OFDM symbols. For example, the data subcarrier TNPR can be calculated for OFDM symbol k as $$\rho^{k,t} = \frac{N - \alpha_{RS}^{k,t} N_{RS}^{k,t}}{N - N_{RS}^k - N_{idle}^k}. \quad (61)$$

The power ratio between data subcarriers for the same packet transmission on antenna t in OFDM symbol i and antenna s in OFDM symbol j can be obtained by comparing the nominal data subcarrier TPR on these two antennas in these two OFDM symbols. Note that for the m-th packet transmission with bandwidth utilization ratio $\mu_m^k < 1$, the nominal TNPR can be defined as:

$$\rho_m^{k,t} = \frac{1}{\mu_m^k} \cdot \frac{N - \alpha_{RS}^{k,t} N_{RS}^{k,t}}{N - N_{RS}^k - N_{idle}^k}. \quad (62)$$

For example, for SFBC-FSTD, $\mu_m^k = \frac{1}{2}$, the nominal TPR for the data subcarriers can be scaled by 2.

Alternatively, this information can be represented by the nominal traffic-to-pilot-ratio (TPR) for antenna t in OFDM symbol k as $$\sigma^{k,t} = \frac{1}{\alpha_{RS}^{k,t}} \cdot \frac{N - \alpha_{RS}^{k,t} N_{RS}^{k,t}}{N - N_{RS}^k - N_{idle}^k}. \quad (63)$$

Again, for the m-th packet transmission with bandwidth utilization ratio $\mu_m^k < 1$, the nominal TPR can be defined as:

$$\sigma_m^{k,t} = \frac{1}{\mu_m^k} \cdot \frac{1}{\alpha_{RS}^{k,t}} \cdot \frac{N - \alpha_{RS}^{k,t} N_{RS}^{k,t}}{N - N_{RS}^k - N_{idle}^k}. \quad (64)$$

In the following description, we will further elaborate this technique with some special cases and examples.

If all subcarriers are utilized, i.e., $N_{unused}^i = 0$, and $N_{unused}^j = 0$. In that case, the formula can be simplified as $$\eta(i, j) = \frac{N - N_{RS}^i}{N - N_{RS}^j}, \quad (65)$$

$$\gamma^{t,s}(i, j) = \frac{N - \alpha_{RS}^{i,t} N_{RS}^{i,t}}{N - \alpha_{RS}^{j,s} N_{RS}^{j,s}} \cdot \frac{1}{\eta(i, j)}. \quad (66)$$

Assuming same power boosting factor for RS symbols in the same OFDM symbol, the power ratio of a transmission on different antennas in the same OFDM symbol can be simplified as:

$$\gamma^{t,s}(i, i) = \frac{N - \alpha_{RS}^{i,t} N_{RS}^{i,t}}{N - \alpha_{RS}^{i,s} N_{RS}^{i,s}} \cdot \frac{1}{\eta(i, i)} = \frac{N - \alpha_{RS} N_{RS}^{i,t}}{N - \alpha_{RS} N_{RS}^{i,s}} \quad (67)$$

If $N_{RS}^{i,t} = N_{RS}^{i,s}$, $\gamma^{t,s}(i,i) = 1$. In other words, in an OFDM symbol, the power ratio of data subcarriers on two antennas with the same RS density is the same, which is the case for ANTP0 and ANTP1 in all OFDM symbols in LTE downlink. If $N_{RS}^{i,t} > 0$, and $N_{RS}^{i,s} = 0$, $$\gamma^{t,s}(i, i) = \frac{N - \alpha_{RS} N_{RS}^{i,t}}{N},$$

which is the case for ANTP0 and ANTP2 in the first and the second OFDM symbols in LTE downlink.

In the following example, we illustrate how the equations can be used for calculating the power ratio in an LTE downlink system with two transmission antennas (2-Tx). In an LTE downlink system, we use the same RS boosting factor for all antennas in all of the RS symbols. We fully utilize all available subcarriers, i.e., $N_{idle}^k = 0$ for any OFDM symbol k. We also use $$N_{RS}^{i,t} = \frac{1}{6} N$$

in OFDM symbol i where RS symbols for antenna t are present, and $N_{RS}^{i,t} = 0$ otherwise. We use the same RS power boosting factor $\alpha_{RS}$ for all RS symbols. Indexing the OFDM symbols from 1 to 14, and indexing the antennas by 0 and 1, the value of $N_{RS}^{i,t}$ can be illustrated in the following table.

TABLE 1

The value of RS density (2Tx system)

| | OFDM symbol indices | |
|---|---|---|
| | 1, 5, 8, 12 | 2, 3, 4, 6, 7, 9, 10, 11, 13, 14 |
| Antenna 0 | N/6 | 0 |
| Antenna 1 | N/6 | 0 |

Thus, $N_{RS}^i = N/3$ for i=1, 5, 8, 12, and $N_{RS}^i = 0$ for i=2, 3, 4, 6, 7, 9, 10, 11, 13, 14. Thus, for an LTE system with 2 transmission antennas, the bandwidth ratio can be calculated as:

$$\eta(i, j) = \begin{cases} 1 & i, j \in \{1, 5, 8, 12\} \text{ or } i, j, \in \{2, 3, 4, 6, 7, 9, 10, 11, 13, 14\} \\ 2/3 & i \in \{1, 5, 8, 12\} \text{ and } j \in \{2, 3, 4, 6, 7, 9, 10, 11, 13, 14\} \\ 3/2 & i \in \{2, 3, 4, 6, 7, 9, 10, 11, 13, 14\} \text{ and } j \in \{1, 5, 8, 12\} \end{cases} \quad (68)$$

Likewise, the power ratio between antenna 0 in OFDM symbol i and antenna 1 in OFDMj can be calculated as in the following table.

TABLE 2

The value of power ratio for LTE downlink (2Tx system)

| i, j ∈ {1, 5, 8, 12} OR i, j ∈ {2, 3, 4, 6, 7, 9, 10, 11, 13, 14} | i ∈ {1, 5, 8, 12} AND j ∈ {2, 3, 4, 6, 7, 9, 10, 11, 13, 14} | i ∈ {2, 3, 4, 6, 7, 9, 10, 11, 13, 14} AND j ∈ {1, 5, 8, 12} |
|---|---|---|
| Power ratio 1 | $(6-\alpha_{RS})/4$ | $4/(6-\alpha_{RS})$ |

We can also specify the nominal data subcarrier TNPR $\rho^{k,t}$ on antenna t for OFDM symbol k as:

$$\rho^{k,t} = \begin{cases} (6-\alpha_{RS})/4 & k \in \{1, 5, 8, 12\} \\ 1 & k \in \{2, 3, 4, 6, 7, 9, 10, 11, 13, 14\} \end{cases}, \quad (69)$$

for $t = 0, 1$.

Alternatively, we can specify the nominal TPR $\sigma^{k,t}$ for data subcarrier on antenna t in OFDM symbol k as:

$$\sigma^{k,t} = \begin{cases} \dfrac{6-\alpha_{RS}}{4 \cdot \alpha_{RS}} & k \in \{1, 5, 8, 12\} \\ 1/\alpha_{RS} & k \in \{2, 3, 4, 6, 7, 9, 10, 11, 13, 14\} \end{cases}. \quad (70)$$

In the following example, we illustrate how the equations can be used for calculating the power ratio in an LTE downlink system with four transmission antennas (4-Tx). In an LTE downlink system, we use the same RS boosting factor for all antennas in all of the RS symbols. We fully utilize all available subcarriers, i.e., $N_{idle}^k = 0$ for any OFDM symbol k. We also use $$N_{RS}^{i,t} = \frac{1}{6} N$$

in OFDM symbol i where RS symbols for antenna t are present, and $N_{RS}^{i,t} = 0$ otherwise. We use the same RS power boosting factor $\alpha_{RS}$ for all RS symbols. Indexing the OFDM symbols from 1 to 14, and indexing the antennas from 0 to 3, the value of $N_{RS}^{i,t}$ can be illustrated in the following table.

TABLE 3

The value of RS density (4Tx system)

| | OFDM symbol indices | | |
|---|---|---|---|
| | 1, 5, 8, 12 | 2, 9 | 3, 4, 6, 7, 10, 11, 13, 14 |
| Antenna 0 | N/6 | 0 | 0 |
| Antenna 1 | N/6 | 0 | 0 |

TABLE 3-continued

The value of RS density (4Tx system)

| | OFDM symbol indices | | |
|---|---|---|---|
| | 1, 5, 8, 12 | 2, 9 | 3, 4, 6, 7, 10, 11, 13, 14 |
| Antenna 2 | 0 | N/6 | 0 |
| Antenna 3 | 0 | N/6 | 0 |

Thus, $N_{RS}^i = N/3$ for i=1, 2, 5, 8, 9, 12, and $N_{RS}^i = 0$ for i=3, 4, 6, 7, 10, 11, 13, 14. Thus, for an LTE system with 4 transmission antennas, the bandwidth ratio can be calculated as:

$$\eta(i, j) = \begin{cases} 1 & i, j \in \{1, 2, 5, 8, 9, 12\} \text{ or } i, j \in \{3, 4, 6, 7, 10, 11, 13, 14\} \\ 2/3 & i \in \{1, 2, 5, 8, 9, 12\} \text{ and } j \in \{3, 4, 6, 7, 10, 11, 13, 14\} \\ 3/2 & i \in \{3, 4, 6, 7, 10, 11, 13, 14\} \text{ and } j \in \{1, 2, 5, 8, 9, 12\} \end{cases} \quad (71)$$

Likewise, the power ratio $\gamma^{t,s}(i,j)$ between antenna t in OFDM symbol i and antenna s in OFDM symbol j can be calculated as in the following table.

TABLE 4

Values of power ratio for LTE downlink (4Tx system)

| | i, j ∈ {1, 2, 5, 8, 9, 12} OR i, j ∈ {3, 4, 6, 7, 10, 11, 13, 14} | i ∈ {1, 2, 5, 8, 9, 12} AND j ∈ {3, 4, 6, 7, 10, 11, 13, 14} | i ∈ {3, 4, 6, 7, 10, 11, 13, 14} AND j ∈ {1, 2, 5, 8, 9, 12} |
|---|---|---|---|
| t, s ∈ {0, 1} OR t, s ∈ {2, 3} | 1 | 3/2 | 2/3 |
| t ∈ {0, 1} AND s ∈ {2, 3} | $(6-\alpha_{RS})/6$ | $(6-\alpha_{RS})/4$ | $(6-\alpha_{RS})/9$ |
| t ∈ {2, 3} AND s ∈ {0, 1} | $6/(6-\alpha_{RS})$ | $9/(6-\alpha_{RS})$ | $4/(6-\alpha_{RS})$ |

We can specify the nominal data subcarrier TNPR $\rho^{k,t}$ for antenna t in OFDM symbol k as in the following table.

TABLE 5

The nominal data subcarrier TNPR in LTE downlink (4Tx system)

| | k ∈ {1, 5, 8, 12} | k ∈ {2, 9} | k ∈ {3, 4, 6, 7, 10, 11, 13, 14} |
|---|---|---|---|
| t ∈ {0, 1} | $(6-\alpha_{RS})/4$ | 3/2 | 1 |
| t ∈ {2, 3} | 3/2 | $(6-\alpha_{RS})/4$ | 1 |

Alternatively, we can specify the nominal data subcarrier TPR $\sigma^{k,t}$ for antenna t in OFDM symbol k as in the following table.

TABLE 6

The nominal data subcarrier TPR in LTE downlink (4Tx system)

| | k ∈ {1, 5, 8, 12} | k ∈ {2, 9} | k ∈ {3, 4, 6, 7, 10, 11, 13, 14} |
|---|---|---|---|
| t ∈ {0, 1} | $(6-\alpha_{RS})/4\alpha_{RS}$ | $3/2\alpha_{RS}$ | $1/\alpha_{RS}$ |
| t ∈ {2, 3} | $3/2\alpha_{RS}$ | $(6-\alpha_{RS})/4\alpha_{RS}$ | $1/\alpha_{RS}$ |

In addition, if the bandwidth utilization ratio is less than 1, the TNPR or TPR should preferably be properly compensated. For example, preferably, the nominal data subcarrier TPR $\sigma_m^{k,t}$ for antenna t in OFDM symbol k for SFBC-FSTD transmission should be adjusted to values as in the following table.

TABLE 7

The nominal data subcarrier TPR in LTE downlink (4Tx system)

| | $k \in \{1, 5, 8, 12\}$ | $k \in \{2, 9\}$ | $k \in \{3, 4, 6, 7, 10, 11, 13, 14\}$ |
|---|---|---|---|
| $t \in \{0, 1\}$ | $(6 - \alpha_{RS})/2\alpha_{RS}$ | $3/\alpha_{RS}$ | $2/\alpha_{RS}$ |
| $t \in \{2, 3\}$ | $3/\alpha_{RS}$ | $(6 - \alpha_{RS})/2\alpha_{RS}$ | $2/\alpha_{RS}$ |

In the first and second embodiments, there are disclosed several methods for calculating power levels for data modulation symbols on different antenna ports in different OFDM symbols. In the sixth and seventh embodiments, there are disclosed several methods for assigning power ratios on different resource elements and different antennas to achieve improved power utilization. The equations in the six and seventh embodiments can be used to calculate the power level setting in the first and second embodiments. For example, Equation 15 may be derived from Equations 59 and 60 by setting the parameters appropriately.

While the present invention has been shown and described in connection with the preferred embodiments, it will be apparent to those skilled in the art that modifications and variations can be made without departing from the spirit and scope of the invention as defined by the appended claims.

What is claimed is:

1. A method for transmission, the method comprising:
   mapping a plurality of data modulation symbols of a plurality of data packets and a plurality of reference signal symbols into transmission resources of a transmission antenna in accordance with a certain transmission scheme, with the transmission resources being divided into a plurality of subcarriers in a frequency domain and a plurality of time units in a time domain, and within a k-th time unit, N subcarriers being available for transmitting signals, and the N subcarriers comprising $N_{RS}^k$ subcarriers for transmitting reference signal symbols, $N_{idle}^k$ subcarriers that are concurrently unused, and $N_{data}^k$ subcarriers for transmitting data modulation symbols;
   determining bandwidth ratios between respective corresponding pairs of time units for each data packet and power ratios between respective corresponding pairs of time units for each data packet, to maintain a constant bandwidth ratio between each pair of time units across all data packets and a constant power ratio between each pair of time units across all data packets, with the bandwidth ratio $\eta(i,j)$ between an i-th time unit and a j-th time unit being established for each data packet by:

$$\eta(i, j) = \frac{N - N_{RS}^i - N_{idle}^i}{N - N_{RS}^j - N_{idle}^j},$$

and the power ratio $\gamma(i,j)$ between an i-th time unit and a j-th time unit for each data packet being established by:

$$\gamma(i, j) = \frac{N - \alpha_{RS}^i N_{RS}^i}{N - \alpha_{RS}^j N_{RS}^j} \cdot \frac{1}{\eta(i, j)},$$

where $\alpha_{RS}^k$ is a power boosting factor for the reference signal symbols in a k-th time unit; and
   transmitting the plurality of data modulation symbols of the plurality of data packets and the reference signal symbols via the transmission antenna by using the transmission resources, with the transmission of at least one data packet being in accordance with the determined bandwidth ratios and power ratios.

2. The method of claim 1, comprised of determining a data subcarrier traffic-to-nominal-power-spectral-density-ratio (TNPR) for each of the time units, with the data subcarrier TNPR for a k-th time unit being established by:

$$\rho_k = \frac{N - \alpha_{RS}^k N_{RS}^k}{N - N_{RS}^k - N_{idle}^k}.$$

3. The method of claim 1, comprised of determining a nominal data subcarrier traffic-to-pilot-ratio (TPR) for each of the time units, with the nominal data subcarrier TPR for a k-th time unit being established by:

$$\sigma_k = \frac{1}{\alpha_{RS}^k} \cdot \frac{N - \alpha_{RS}^k N_{RS}^k}{N - N_{RS}^k - N_{idle}^k}.$$

4. The method of claim 1, comprised of, when all of the N subcarriers are utilized for transmitting signals, the bandwidth ratio $\eta(i,j)$ between an i-th time unit and a j-th time unit being established for each data packet by:

$$\eta(i, j) = \frac{N - N_{RS}^i}{N - N_{RS}^j},$$

and the power ratio $\gamma(i,j)$ between an i-th time unit and a j-th time unit for each data packet being established by:

$$\gamma(i, j) = \frac{N - \alpha_{RS}^i N_{RS}^i}{N - \alpha_{RS}^j N_{RS}^j} \cdot \frac{N - N_{RS}^j}{N - N_{RS}^i}.$$

5. The method of claim 4, comprised of, when no reference signal symbol is transmitted in the j-th time unit, the bandwidth ratio ratio $\eta(i,j)$ between an i-th time unit and a j-th time unit being established for each data packet by:

$$\eta(i, j) = \frac{N - N_{RS}^i}{N},$$

and the power ratio $\gamma(i,j)$ between an i-th time unit and a j-th time unit for each data packet being established by:

$$\gamma(i, j) = \frac{N - \alpha_{RS}^i N_{RS}^i}{N - N_{RS}^i}.$$

6. A method for transmission, the method comprising:
   mapping a plurality of data modulation symbols of a plurality of data packets and a plurality of reference signal symbols into transmission resources of a plurality of transmission antennas in accordance with a certain transmission scheme, with the transmission resources being divided into a plurality of subcarriers in a frequency domain and a plurality of time units in a time domain, and within a k-th time unit, N subcarriers being available for transmitting signals via all of the plurality of transmission antennas, and the N subcarriers comprising $N_{RS}^k$ subcarriers for transmitting reference signal symbols, $N_{idle}^k$ subcarriers that are concurrently unused, and $N_{data}^k$ subcarriers for transmitting data modulation symbols;

determining bandwidth ratios between respective corresponding pairs of time units for each data packet, and determining power ratios between respective corresponding pairs of transmission antennas in different time units for each data packet, to maintain a constant bandwidth ratio between each pair of time units across all data packets and a constant power ratio between each pair of antennas in different time units across all data packets, with the bandwidth ratio η(i,j) between an i-th time unit and a j-th time unit being established for each data packet by:

$$\eta(i, j) = \frac{N - N_{RS}^i - N_{idle}^i}{N - N_{RS}^j - N_{idle}^j},$$

and the power ratio $\gamma^{t,s}$ (i,j) between a t-th transmission antenna in an i-th time unit and an s-th transmission antenna in a j-th time unit for each data packet being established by:

$$\gamma^{t,s}(i, j) = \frac{N - \alpha_{RS}^{i,t} N_{RS}^{i,t}}{N - \alpha_{RS}^{j,s} N_{RS}^{j,s}} \cdot \frac{1}{\eta(i, j)}.$$

where $\alpha_{RS}^{k,t}$ is a power boosting factor for the reference signal symbols from a t-th transmission antenna in a k-th time unit; and transmitting the plurality of data modulation symbols of the plurality of data packets and the reference signal symbols via the plurality of transmission antennas by using the transmission resources, with the transmission of at least one data packet being in accordance with the determined bandwidth ratios and power ratios.

7. The method of claim 6, comprised of determining a data subcarrier traffic-to-nominal-power-spectral-density-ratio (TNPR) for each of the transmission antenna in each of the time units, with the data subcarrier TNPR for a t-th transmission antenna in a k-th time unit being established by:

$$\rho^{k,t} = \frac{N - \alpha_{RS}^{k,t} N_{RS}^{k,t}}{N - N_{RS}^k - N_{idle}^k}.$$

8. The method of claim 6, comprised of determining a data subcarrier nominal traffic-to-nominal-power-spectral-density-ratio (TNPR) for transmitting each of the data packet via each of the transmission antennas in each of the time units, with the data subcarrier nominal TNPR for transmission of an m-th data packet via a t-th transmission antenna in a k-th time unit being established by:

$$\rho_m^{k,t} = \frac{1}{\mu_m^k} \cdot \frac{N - \alpha_{RS}^{k,t} N_{RS}^{k,t}}{N - N_{RS}^k - N_{idle}^k}.$$

where $\mu_m^k$ is a bandwidth utilization value for transmitting the m-th data packet the k-th time unit.

9. The method of claim 6, comprised of determining a data subcarrier nominal traffic-to-pilot-ratio (TPR) for each of the transmission antenna in each of the time units, with the nominal data subcarrier TPR for a t-th transmission antenna in a k-th time unit being established by:

$$\sigma^{k,t} = \frac{1}{\sigma_{RS}^{k,t}} \cdot \frac{N - \alpha_{RS}^{k,t} N_{RS}^{k,t}}{N - N_{RS}^k - N_{idle}^k}.$$

10. The method of claim 6, comprised of determining a data subcarrier nominal traffic-to-pilot-ratio (TPR) for transmitting each of the data packet via each of the transmission antenna in each of the time units, with the nominal data subcarrier TPR for transmitting an m-th data packet via a t-th transmission antenna in a k-th time unit being established by:

$$\sigma^{k,t} = \frac{1}{\sigma_{RS}^{k,t}} \cdot \frac{N - \alpha_{RS}^{k,t} N_{RS}^{k,t}}{N - N_{RS}^k - N_{idle}^k}.$$

11. The method of claim 6, comprised of, when all of the N subcarriers are utilized for transmitting signals, the bandwidth ratio η(i,j) between the i-th time unit and the j-th time unit being established for each data packet by:

$$\eta(i, j) = \frac{N - N_{RS}^i}{N - N_{RS}^j},$$

and the power ratio γ(i,j) between the t-th transmission antenna in the i-th time unit and the s-th transmission antenna in the j-th time unit for each data packet being established by:

$$\gamma(i, j) = \frac{N - \alpha_{RS}^i N_{RS}^i}{N - \alpha_{RS}^j N_{RS}^j} \cdot \frac{N - N_{RS}^j}{N - N_{RS}^i}.$$

12. The method of claim 11, comprised of, when the reference signal symbols in the same time unit have the same power boosting factor, the power ratio γ(i,j) between the t-th transmission antenna in the i-th time unit and the s-th transmission antenna in the i-th time unit for each data packet being established by $$\gamma^{j,i}(i, i) = \frac{N - \alpha_{RS} N_{RS}^{i,t}}{N - N_{RS}^{i,s}}.$$

13. A method for data transmission in a communication system, the method comprising:

modulating data to be transmitted to generate a plurality of data modulation symbols;

mapping the plurality of data modulation symbols and a plurality of reference signal symbols into transmission resources of each of a plurality of antennas in accordance with a transmit diversity scheme, with the transmission resources of each of the antennas being divided into a plurality of subcarriers in a frequency domain and a plurality of time units in a time domain;

assigning a power scaling factor for data modulation symbols on each of the antennas in dependence upon power levels of the reference signal symbols to maintain a fixed power level across the plurality of antennas in each time unit; and transmitting the data modulation symbols and the reference signal symbols via the plurality of antennas in accordance with the mapping scheme and the assigned scaling factors.

14. The method of claim 13, comprised of transmitting reference signal symbols and four data modulation symbols $S_1, S_2, S_3$ and $S_4$ from among the plurality of data modulation symbols over six subcarriers via four antennas in a certain timer unit, with:

a first reference signal symbol being transmitted via a first antenna over a sixth subcarrier with one-third of a total power that is available for transmission over the six subcarriers in the certain time unit, and a second reference signal symbol being transmitted via a second antenna over a third subcarrier with one-third of the total power; and a transmission matrix with the scaling factors for the four data modulation symbols being established by:

$$T = \begin{bmatrix} T_{11} & T_{12} & T_{14} & T_{15} \\ T_{21} & T_{22} & T_{24} & T_{25} \\ T_{31} & T_{32} & T_{34} & T_{35} \\ T_{41} & T_{42} & T_{44} & T_{45} \end{bmatrix}$$

$$= \begin{bmatrix} S_1 & -S_2^* & 0 & 0 \\ 0 & 0 & S_3 & -S_4^* \\ \sqrt{3/2}\,S_2 & \sqrt{3/2}\,S_1^* & 0 & 0 \\ 0 & 0 & \sqrt{3/2}\,S_4 & \sqrt{3/2}\,S_3^* \end{bmatrix},$$

where $T_{ij}$ represents the symbol transmitted on the ith antenna port and the jth subcarrier.

15. The method of claim 14, comprised of transmitting a signal containing information regarding channel gains for each of the data modulation symbols, with:

the channel gains for each of the data modulation symbols $S_1$ and $S_2$ being established by:

$$g_{12} = \left(h_0^2 + \frac{3}{2}h_2^2\right)S_i, \text{ for } i = 1, 2; \text{ and}$$

the channel gains for each of the data modulation symbols $S_1$ and $S_2$ being established by:

$$g_{34} = \left(h_1^2 + \frac{3}{2}h_3^2\right)S_i, \text{ for } i = 3, 4,$$

where $h_0$, $h_1$, $h_2$ and $h_3$ are channel gains from the first antenna, the second antenna, the third antenna and the fourth antenna, respectively.

16. The method of claim 13, comprised of transmitting reference signal symbols and four data modulation symbols $S_1, S_2, S_3$ and $S_4$ from among the plurality of data modulation symbols over six subcarriers via four antennas in a certain timer unit, with:

a third reference signal symbol being transmitted via a third antenna over a sixth subcarrier with one-third of a total power that is available for transmission over the six subcarriers, and a fourth reference signal symbol being transmitted via a fourth antenna over a third subcarrier with one-third of the total power; and a transmission matrix with the scaling factors for the four data modulation symbols being established by:

$$T = \begin{bmatrix} T_{11} & T_{12} & T_{14} & T_{15} \\ T_{21} & T_{22} & T_{24} & T_{25} \\ T_{31} & T_{32} & T_{34} & T_{35} \\ T_{41} & T_{42} & T_{44} & T_{45} \end{bmatrix}$$

$$= \begin{bmatrix} \sqrt{3/2}\,S_1 & -\sqrt{3/2}\,S_2^* & 0 & 0 \\ 0 & 0 & \sqrt{3/2}\,S_3 & -\sqrt{3/2}\,S_4^* \\ S_2 & S_1^* & 0 & 0 \\ 0 & 0 & S_4 & S_3^* \end{bmatrix},$$

where $T_{ij}$ represents the symbol transmitted on the ith antenna port and the jth subcarrier.

17. The method of claim 13, comprised of transmitting four data modulation symbols $S_1, S_2, S_3$ and $S_4$ from among the plurality of data modulation symbols over six subcarriers via four antennas in a certain timer unit, with a transmission matrix being established by:

$$T = \begin{bmatrix} T_{11} & T_{12} & T_{14} & T_{15} \\ T_{21} & T_{22} & T_{24} & T_{25} \\ T_{31} & T_{32} & T_{34} & T_{35} \\ T_{41} & T_{42} & T_{44} & T_{45} \end{bmatrix}$$

$$= \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

where $T_{ij}$ represents the symbol transmitted on the ith antenna port and the jth subcarrier.

18. The method of claim 13, comprised of transmitting a signal containing information regarding the ratios between the assigned scaling factors of the antennas.

19. The method of claim 13, comprised of transmitting a signal containing information regarding channel gains for each of the data modulation symbols, with the channel gains being calculated in dependence upon the assigned scaling factors of the antennas.

20. The method of claim 13, comprised of transmitting a signal containing information regarding the ratios of the total power from all of the antennas for each data modulation symbol between different time units.

21. The method of claim 13, comprised of transmitting reference signal symbols and four data modulation symbols $S_1, S_2, S_3$ and $S_4$ from among the plurality of data modulation symbols over six subcarriers via four antennas in a certain timer unit, with:

a first reference signal symbol being transmitted via a first antenna over a sixth subcarrier with two-thirds of a total power that is available for transmission over the six subcarriers, and a second reference signal symbol being transmitted via a second antenna over a third subcarrier with two-thirds of the total power; and a transmission matrix with the scaling factors for the four data modulation symbols being established by:

$$T = \begin{bmatrix} T_{11} & T_{12} & T_{14} & T_{15} \\ T_{21} & T_{22} & T_{24} & T_{25} \\ T_{31} & T_{32} & T_{34} & T_{35} \\ T_{41} & T_{42} & T_{44} & T_{45} \end{bmatrix} = \begin{bmatrix} S_1 & -S_2^* & 0 & 0 \\ 0 & 0 & S_3 & -S_4^* \\ \sqrt{3}\,S_2 & \sqrt{3}\,S_1^* & 0 & 0 \\ 0 & 0 & \sqrt{3}\,S_4 & \sqrt{3}\,S_3^* \end{bmatrix},$$

where $T_{ij}$ represents the symbol transmitted on the ith antenna port and the jth subcarrier.

22. The method of claim 21, comprised of transmitting a signal containing information regarding channel gains for each of the data modulation symbols, with:

the channel gains for each of the data modulation $S_1$ and $S_2$ being established by:

$$g_{12} = (h_0^2 + 3h_2^2)S_i, \text{ for } i=1, 2; \text{ and}$$

the channel gains for each of the data modulation symbols $S_1$ and $S_2$ being established by:

$$g_{34} = (h_1^2 + 3h_3^2)S_i, \text{ for } i=3, 4,$$

where $h_0$, $h_1$, $h_2$ and $h_3$ are channel gains from the first antenna, the second antenna, the third antenna and the fourth antenna, respectively.

23. A method for data transmission in a communication system, the method comprising:
- modulating data to be transmitted to generate a plurality of data modulation symbols;
- mapping the plurality of data modulation symbols into at least one modulation layer in a multiple input and multiple output system;
- mapping the plurality of data modulation symbols and a plurality of reference signal symbols into transmission resources of a plurality of transmission antennas in accordance with a precoding matrix, with one modulation layer corresponding to a selected column in the precoding matrix, and each row of the precoding matrix corresponding to an antenna from a plurality of antennas for transmitting the data modulation symbols;
- assigning a power scaling factor to each of the rows in the precoding matrix in dependence upon power levels of the reference signal symbols to maintain a fixed power level across the plurality of antennas in a certain time unit; and
- transmitting the data modulation symbols and the reference signal symbols via the plurality of antennas.

24. The method of claim 23, comprised of the precoding matrix being constructed based upon a Householder matrix, with the Householder matrix being established by:

$$T = I_4 - 2u_1 u_1^H / \|u_1\|^2 = 0.5 * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

where $u_1^T = [\,1 \;\; -1 \;\; -1 \;\; -1\,]$.

25. The method of claim 24, comprised of transmitting two reference signal symbols and two modulation layers over six subcarriers via four antennas in the certain time unit, with:

a first reference signal symbol being transmitted over a sixth subcarrier via a first antenna by using one-third of a total power that is available for transmission over the six subcarriers, and a second reference signal symbol being transmitted via a second antenna over a third subcarrier with one-third of the total power; and the precoding matrix being established by:

$$M_1' = 0.5 * \begin{bmatrix} 1 & 0 & 1 & 0 \\ 1 & 0 & -1 & 0 \\ 3/2 & 0 & 3/2 & 0 \\ 3/2 & 0 & -3/2 & 0 \end{bmatrix}$$

with a first modulation layer corresponding to the first column of the precoding matrix, and a second modulation layer corresponding to the third column of the precoding matrix.

26. The method of claim 23, comprised of the precoding matrix being constructed based upon a Fourier matrix, with an N×N Fourier matrix being established by:

$$P_N = e^{j2\pi mn/N} \; m,n=0, 1, \ldots (N-1).$$

27. The method of claim 26, comprised of transmitting two reference signal symbols and four modulation layers over six subcarriers via four antennas in the certain time unit, with:

a first reference signal symbol being transmitted over a sixth subcarrier via a first antenna by using one-third of a total power that is available for transmission over the six subcarriers, and a second reference signal symbol being transmitted via a second antenna over a third subcarrier with one-third of the total power; and the precoding matrix being established by:

$$P_4' = \begin{bmatrix} 1 & 1 & 1 & 1 \\ 1 & j & -1 & -j \\ 3/2 & -3/2 & 3/2 & -3/2 \\ 3/2 & -j3/2 & -3/2 & j3/2 \end{bmatrix}$$

with a first modulation layer corresponding to the first column of the precoding matrix, a second modulation layer corresponding to the second column of the precoding matrix, a third modulation layer corresponding to the third column of the precoding matrix, and a fourth modulation layer corresponding to the fourth column of the precoding matrix.

28. The method of claim 23, comprised of transmitting a signal containing information regarding the ratios between the assigned scaling factors of the antennas.

29. The method of claim 28, comprised of the signal containing information regarding the ratios of the total power from all of the antennas for each modulation symbol between different time units.

30. A wireless terminal in a communication system, the wireless terminal comprising:
a modulation unit configured to modulate data to be transmitted to generate a plurality of data modulation symbols;

a mapping unit configured to map the plurality of data modulation symbols into transmission resources of each of a plurality of antennas in accordance with a transmit diversity scheme, with the transmission resources of each of the antennas being divided into a plurality of subcarriers in a frequency domain and a plurality of time units in a time domain; and a power scaling unit configured to assign a scaling factor for each of the antennas to maintain a fixed power level across the plurality of antennas in each time unit.

31. A wireless terminal in a communication system, the wireless terminal comprising:

a modulation unit configured to modulate data to be transmitted to generate a plurality of data modulation symbols;

a layer generation unit configured to map the plurality of data modulation symbols into at least one modulation layer in a multiple input and multiple output system; and a precoding unit, with the precoding unit configured to:

construct a precoding matrix for precoding the data modulation symbols in the at least one modulation layer, with one modulation layer corresponding to a selected column in the precoding matrix, and each row of the precoding matrix corresponding to an antenna from a plurality of antennas for transmitting the data modulation symbols, assign a power scaling factor to each of the rows in the precoding matrix to maintain a fixed power level across the plurality of antennas in a certain time unit, and precode the data modulation symbols by using the precoding matrix.

32. A wireless terminal in a communication system, the wireless terminal comprising:

a mapping unit configured to map a plurality of data modulation symbols of a plurality of data packets and a plurality of reference signal symbols into transmission resources of a transmission antenna in accordance with a certain transmit diversity scheme, with the transmission resources being divided into a plurality of subcarriers in a frequency domain and a plurality of time units in a time domain, and within a k-th time unit, N subcarriers being available for transmitting signals, and the N subcarriers comprising $N_{RS}^k$ subcarriers for transmitting reference signal symbols, $N_{idle}^k$ subcarriers that are concurrently unused, and $N_{data}^k$ subcarriers for transmitting data modulation symbols;

a processing unit configured to determine bandwidth ratios between respective corresponding pairs of time units for each data packet and power ratios between respective corresponding pairs of time units for each data packet, to maintain a constant bandwidth ratio between each pair of time units across all data packets and a constant power ratio between each pair of time units across all data packets, with the bandwidth ratio $\eta(i,j)$ between an i-th time unit and a j-th time unit being established for each data packet by:

$$\eta(i, j) = \frac{N - N_{RS}^i - N_{idle}^i}{N - N_{RS}^j - N_{idle}^j},$$

and the power ratio $\gamma(i,j)$ between an i-th time unit and a j-th time unit for each data packet being established by:

$$\gamma(i, j) = \frac{N - \alpha_{RS}^i N_{RS}^i}{N - \alpha_{RS}^j N_{RS}^j} \cdot \frac{1}{\eta(i, j)},$$

where $\alpha_{RS}^k$ is a power boosting factor for the reference signal symbols in a k-th time unit; and the transmission antenna configured to transmit the plurality of data modulation symbols of the plurality of data packets and the reference signal symbols by using the transmission resources, with the transmission of at least one data packet being in accordance with the determined bandwidth ratios and power ratios.

33. A wireless terminal in a communication system, the wireless terminal comprising:

a mapping unit configured to map a plurality of data modulation symbols of a plurality of data packets and a plurality of reference signal symbols into transmission resources of a plurality of transmission antennas in accordance with a certain transmit diversity scheme, with the transmission resources being divided into a plurality of subcarriers in a frequency domain and a plurality of time units in a time domain, and within a k-th time unit, N subcarriers being available for transmitting signals via all of the plurality of transmission antennas, and the N subcarriers comprising $N_{RS}^k$ subcarriers for transmitting reference signal symbols, $N_{idle}^k$ subcarriers that are concurrently unused, and $N_{data}^k$ subcarriers for transmitting data modulation symbols; and a processing unit configured to determine bandwidth ratios between respective corresponding pairs of time units for each data packet, and determining power ratios between respective corresponding pairs of transmission antennas in different time units for each data packet, to maintain a constant bandwidth ratio between each pair of time units across all data packets and a constant power ratio between each pair of antennas in different time units across all data packets, with the bandwidth ratio $\eta(i,j)$ between an i-th time unit and a j-th time unit being established for each data packet by:

$$\eta(i, j) = \frac{N - N_{RS}^i - N_{idle}^i}{N - N_{RS}^j - N_{idle}^j},$$

and the power ratio $\gamma^{t,s}(i,j)$ between a t-th transmission antenna in an i-th time unit and an s-th transmission antenna in a j-th time unit for each data packet being established by:

$$\gamma^{t,s}(i, j) = \frac{N - \alpha_{RS}^{i,t} N_{RS}^{i,t}}{N - \alpha_{RS}^{j,s} N_{RS}^{j,s}} \cdot \frac{1}{\eta(i, j)},$$

where $\alpha_{RS}^{k,t}$ is a power boosting factor for the reference signal symbols from a t-th transmission antenna in a k-th time unit, wherein the plurality of transmission antennas are configured to transmit the plurality of data modulation symbols of the plurality of data packets and the reference signal symbols by using the transmission resources, with the transmission of at least one data packet being in accordance with the determined bandwidth ratios and power ratios.

* * * * *